(12) United States Patent
Kang et al.

(10) Patent No.: US 12,134,853 B2
(45) Date of Patent: *Nov. 5, 2024

(54) CLOTHES TREATMENT APPARATUS

(71) Applicant: LG ELECTRONICS INC., Seoul (KR)

(72) Inventors: Hyungha Kang, Seoul (KR); Jaehyung Kim, Seoul (KR); Semin Jang, Seoul (KR); Joosik Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

This patent is subject to a terminal disclaimer.

(21) Appl. No.: 18/122,559

(22) Filed: Mar. 16, 2023

(65) Prior Publication Data

US 2023/0220605 A1    Jul. 13, 2023

Related U.S. Application Data

(63) Continuation of application No. 16/770,453, filed as application No. PCT/KR2018/015553 on Dec. 7, 2018, now Pat. No. 11,629,452.

(30) Foreign Application Priority Data

Dec. 8, 2017   (KR) .................. 10-2017-0168512

(51) Int. Cl.
*D06F 58/10* (2006.01)
*B01D 46/00* (2022.01)
(Continued)

(52) U.S. Cl.
CPC ......... *D06F 58/10* (2013.01); *B01D 46/0013* (2013.01); *B01D 46/4227* (2013.01);
(Continued)

(58) Field of Classification Search
None
See application file for complete search history.

(56) References Cited

U.S. PATENT DOCUMENTS

2003/0014880 A1    1/2003   Baurmann
2009/0158608 A1    6/2009   Schaub et al.
(Continued)

FOREIGN PATENT DOCUMENTS

CN   105671850 A   6/2016
CN   106049008 A   10/2016
(Continued)

OTHER PUBLICATIONS

JPH04327900A_ENG (Espacenet machine translation of Ura) (Year: 1992).*
(Continued)

*Primary Examiner* — Gabriel E Gitman
(74) *Attorney, Agent, or Firm* — Birch, Stewart, Kolasch & Birch, LLP

(57) ABSTRACT

A clothes treatment apparatus includes: a cabinet forming a treatment space for storing clothes; a filter module having a filter portion for filtering out dust from air passing therethrough; an air flow path having a plurality of preset flow paths for directing air to be discharged into the treatment space; a fan for moving the air in the air flow path; at least one valve disposed on the air flow path; a valve actuating module for actuating the valve; and a control part for controlling the valve actuating module so as to select one of the plurality of flow paths. The plurality of flow paths include: at least one bypass flow path for directing the air to bypass the filter portion; and at least one filtering flow path for directing the air to pass through the filter portion.

14 Claims, 15 Drawing Sheets

(51) Int. Cl.
*B01D 46/42* (2006.01)
*D06F 58/22* (2006.01)
*D06F 73/02* (2006.01)
*D06F 87/00* (2006.01)
*F16K 11/14* (2006.01)
*F16K 31/04* (2006.01)
*D06F 58/30* (2020.01)
*D06F 105/32* (2020.01)
*D06F 105/34* (2020.01)

(52) U.S. Cl.
CPC ......... *B01D 46/4272* (2013.01); *D06F 58/22* (2013.01); *D06F 73/02* (2013.01); *D06F 87/00* (2013.01); *F16K 11/14* (2013.01); *F16K 31/047* (2013.01); *B01D 2273/30* (2013.01); *B01D 2279/55* (2013.01); *D06F 58/30* (2020.02); *D06F 2105/32* (2020.02); *D06F 2105/34* (2020.02)

(56) References Cited

U.S. PATENT DOCUMENTS

| | | |
|---|---|---|
| 2010/0132208 A1 | 6/2010 | Moon et al. |
| 2016/0115638 A1 | 4/2016 | Kim et al. |

FOREIGN PATENT DOCUMENTS

| | | | | |
|---|---|---|---|---|
| EP | 1 277 872 A2 | | 1/2003 | |
| EP | 3 034 669 A1 | | 6/2016 | |
| FR | 2 408 004 A1 | | 6/1979 | |
| JP | 4-327900 A | | 11/1992 | |
| JP | H04327900 A | * | 11/1992 | ............. D06F 73/02 |
| JP | 2001-208413 A | | 8/2001 | |
| JP | 2008-253656 A | | 10/2008 | |
| JP | 2016-165357 A | | 9/2016 | |
| KR | 2003-0094988 A | | 12/2003 | |
| KR | 10-2008-0074377 A | | 7/2006 | |
| KR | 10-2009-0013966 A | | 2/2009 | |
| KR | 10-2009-0102401 A | | 9/2009 | |
| KR | 10-2011-0082375 A | | 7/2011 | |
| KR | 10-1337699 B1 | | 12/2013 | |
| KR | 10-2014-0095740 A | | 8/2014 | |
| KR | 10-2014-0114649 A | | 9/2014 | |
| KR | 10-2017-0128958 A | | 11/2017 | |
| WO | WO 2018/208129 A1 | | 11/2018 | |

OTHER PUBLICATIONS

CN106049008A_ENG (Espacenet machine translation of Teng) (Year: 2016).
European Search Report, dated Aug. 13, 2021, issued in Patent Application No. 18885334.5 (8 Pages).
JP2008253656A_ENG (Espacenet machine translation of Fukui) (Year: 2008).
Korean Office Action, dated Sep. 10, 2021, issued in Patent Application No. 10-2021-0110334 (7 Pages).
KR1020110082375_ENG (KIPRIS machine translation of Choi) (Year: 2012).
KR20140114649A_ENG (Espacenet machine translation of Jin) (Year: 2014).
Office Action, dated Apr. 15, 2021, issued in Australian Patent Application No. 2018380774 (9 pages).
Office Action, dated Jan. 26, 2021, issued in Korean Patent Application No. 10-2019-0079316 (6 Pages).
PCT International Search Report, dated Apr. 9, 2019, issued in International Application No. PCT/KR2018/015553 (14 Pages).

* cited by examiner

CLOTHES TREATMENT APPARATUS

CROSS-REFERENCE TO RELATED APPLICATIONS

This application is a Continuation of U.S. application Ser. No. 16/770,453, filed on Jun. 5, 2020, which is the National Phase under 35 U.S.C. § 371 of International Application No. PCT/KR2018/015553, filed on Dec. 7, 2018, which claims priority under 35 U.S.C. § 119(a) to Application No. 10-2017-0168512, filed in the Republic of Korea on Dec. 8, 2017, all of which are hereby expressly incorporated by reference into the present application.

TECHNICAL FIELD

The present disclosure relates to an air flow path structure in a clothes treatment apparatus.

BACKGROUND ART

A clothes treatment apparatus refers to all kinds of apparatuses for maintaining or treating clothes, such washing, drying, and dewrinkling them, at home or at a laundromat. Examples of clothes treatment apparatuses include a washer for washing clothes, a dryer for drying clothes, a washer-dryer which performs both washing and drying functions, a refresher for refreshing clothes, and a steamer for removing unnecessary wrinkles in clothes.

More specifically, the refresher is a device used for keeping clothes crisp and fresh, which performs functions like drying clothes, providing fragrance to clothes, preventing static cling on clothes, removing wrinkles from clothes, and so on. The steamer is generally a device that provides steam to clothes to remove wrinkles from them, which can remove wrinkles from clothes in a more delicate way, without the hot plate touching the clothes like in traditional irons. There is a known clothes treatment apparatus equipped with both the refresher and steamer functions, that functions to remove wrinkles and smells from clothes put inside it by using steam and hot air.

There is also a known apparatus that comes with a rack for hanging clothes in a treatment chamber, and that provides steam into the treatment chamber where the clothes are hung or provides hot air while circulating the air in the treatment chamber.

PRIOR ART DOCUMENT

Patent Document

Korean Registered Patent Publication No. 10-1525568.

DISCLOSURE

Technical Problem

One of the problems with the conventional art is that it only allows limited functional versatility when it comes to combining each component's functions and various air flow paths. A first aspect of the present disclosure is to solve this problem.

Another problem with the conventional art is that it is difficult to remove ultrafine dust clinging to clothes. A second aspect of the present disclosure is to solve this problem.

A third aspect of the present disclosure is to provide a clothes treatment apparatus with greater functional versatility by providing outside air to clothes as necessary.

A fourth aspect of the present disclosure is to provide an efficient structure for controlling the change of flow paths.

A fifth aspect of the present disclosure is to help the user easily replace and wash a filter and prevent filter failures.

A sixth aspect of the present disclosure is to allow for easy removal of a replaceable filter and at the same time to protect it at normal times.

A seventh aspect of the present disclosure is to provide an efficient structure that can function on air passing through various flow paths.

Technical Solution

In order to address the aforementioned aspects, a clothes treatment apparatus according to an exemplary embodiment of the present disclosure comprises: a cabinet forming a treatment space for storing clothes; a filter module having a filter portion for filtering out dust from air passing therethrough; an air flow path having a plurality of preset flow paths for directing air to be discharged into the treatment space; a fan for moving the air in the air flow path; at least one valve disposed on the air flow path; a valve actuating module for actuating the valve; and a control part for controlling the valve actuating module so as to select one of the plurality of flow paths.

The plurality of flow paths may comprise: at least one bypass flow path for directing the air to bypass the filter portion; and at least one filtering flow path for directing the air to pass through the filter portion.

The plurality of flow paths may comprise: at least one circulation flow path for directing air drawn in from inside the treatment space; and at least one ventilation flow path for directing air drawn in from an outer space of the cabinet.

The plurality of flow paths may comprise: a bypass circulation flow path for directing air drawn in from inside the treatment space to bypass the filter portion; a filtering circulation flow path for directing the air drawn in from inside the treatment space to pass through the filter portion; and a ventilation flow path for directing air drawn in from an outer space of the cabinet to pass through the filter portion.

The clothes treatment apparatus may further comprise a steam module for supplying steam into the treatment space, and the filter portion may comprise a HEPA filter.

The bypass flow path may be configured to direct air drawn in from inside the treatment space. The control part may be configured to select one of a plurality of preset modes. The plurality of modes may comprise: a bypass mode in which the steam module sprays steam into the treatment space, the fan is operating, and the bypass flow path is selected from among the plurality of flow paths; and a filtering mode in which the steam mode does not spray steam into the treatment space, the fan is operating, and the filtering flow path is selected from among the plurality of flow paths.

The fan may be disposed in a shared section which commonly constitutes part of the bypass flow path and part of the filtering flow path. The clothes treatment apparatus may further comprise a heat exchange module which is disposed in the shared section and heats or cools air.

The at least one bypass flow path may comprise a bypass circulation flow path for directing air drawn in from inside the treatment space. The at least one filtering flow path may comprise a filtering circulation flow path for directing the air drawn in from inside the treatment space.

The at least one filtering flow path may further comprise a ventilation flow path for directing air drawn in from an outer space of the cabinet.

The clothes treatment apparatus may further comprise: an outer intake portion forming an outside air inlet section which constitutes an upstream end of the ventilation flow path and is configured to open and close; and an outer discharge portion forming an exhaust air outlet section which is disposed between the treatment space and the outer space and configured to open and close.

The at least one valve may comprise: a first valve disposed on the bypass flow path to open and close the flow path; and a second valve disposed on the filtering flow path to open and close the flow path. The valve actuating module may comprise a single motor that provides torque to open and close the first valve and the second valve.

The valve actuating module may be configured in such a way as to select one of a plurality of modes including a first mode in which the first valve is opened and the second valve is closed, a second mode in which the first valve is closed and the second valve is opened, and a third mode in which both the first valve and the second valve are closed.

The valve actuating module may comprise: a first valve connecting portion connected to the first valve so that the first valve rotates together with the rotation of the first valve connecting portion around a predetermined, first rotational axis; a second valve connecting portion connected to the second valve so that the second valve rotates together with the rotation of the second valve connecting portion around a predetermined, second rotational axis; and a valve regulating portion configured to rotate around a predetermined central axis, powered by the motor, and to rotate either the first valve connecting portion or the second valve connecting portion depending on the angle of rotation.

A first gear portion of the first valve connecting portion and a second gear portion of the second valve connecting portion may be positioned at the same distance from the central axis, and the valve regulating portion may comprise a driving gear portion configured to mesh with either the first gear portion or the second gear portion depending on the angle of rotation.

The first valve connecting portion may comprise a first gear portion, and the second valve connecting portion may comprise a second gear portion. The valve regulating portion may comprise a driving gear portion formed along the direction of rotation within the range of a predetermined angle Ag2 with respect to the central axis. The angle Ag1 formed between the first rotational axis and the second rotational axis with respect to the central axis may be greater than the angle Ag2.

The first gear portion and the second gear portion may have the same shape, and the first rotational axis and the second rotational axis may be positioned at the same distance d from the central axis.

The valve actuating module may comprise a power transmitting portion that transmits the torque of the motor to the valve regulating portion.

The power transmitting portion may comprise a worm gear fixed to the motor shaft of the motor to rotate. The valve regulating portion may further comprise a driven gear portion meshing with the worm gear.

The valve actuating module may comprise a constraining portion that restricts the range of rotation of the valve regulating portion.

The constraining portion may comprise: a first constraining portion that limits the maximum value for rotation of the valve regulating portion in a first direction; and a second constraining portion that limits the maximum value for rotation of the valve regulating portion in a second direction. When the valve regulating portion is fully rotated in the first direction, the first valve may be opened, and when the valve regulating portion is fully rotated in the second direction, the second valve may be opened.

The filter module may be configured in such a way as to be pulled out in a direction across the filtering flow path. The filter module may further comprise a cover that covers a side where the filter module is pulled out and that is removably placed on the cabinet.

The cover may form an inner intake opening through which air is admitted to the bypass flow path and the filtering flow path. The cover may further comprise an auxiliary filter removably placed between the filter module and the cover and comprising an auxiliary filter portion which filters out impurities from the air moving to the bypass flow path and filtering flow path through the inner intake opening but is functionally different from the filter portion.

The cover may form at least part of the inner intake opening through which air is admitted to the bypass flow path and the filtering flow path. The cover may comprise a fragrance sheet.

Advantageous Effects

The clothes treatment apparatus is advantageous in that it can implement more various and diverse functions by switching between flow paths.

Another advantage is that it can remove impurities from air supplied into the treatment space when necessary, taking into consideration the effect of air on the filter portion, by including the bypass flow path and the filtering flow path.

Also, fresh air can be supplied to clothes by including a ventilation flow path. A further advantage is that the effect on the air around the clothes treatment apparatus can be taken into consideration since the ventilation flow path can be selected.

By disposing the fan and the heat exchange module in the shared section, whichever one of the plurality of flow paths is selected may move the air in the flow path by operating a single fan and heat or cool the air in the flow path by means of a single heat exchange module.

By including the filtering flow path and the bypass flow path, in addition to the steam module and the HEPA filter, the high-performance functions of the HEPA filter can be employed, and steam can be guided not to pass through the HEPA when supplied into the treatment space through the steam module.

In the bypass mode, by spraying steam into the treatment space and selecting the bypass flow path, an air treatment can be done while circulating the air in the treatment space, without allowing the steam supplied to the treatment space to pass through the filter portion.

By making the predetermined angle Ag1 greater than the angle Ag2, either the first valve connecting portion or the second valve connecting portion can be rotated depending on the angle of rotation of the valve regulating portion.

By positioning the first gear portion and the second gear portion at the same distance from the central axis, both the first gear portion and the second gear portion can be manipulated by the single driving gear portion.

By forming the first gear portion and the second gear portion in the same shape and positioning the first rotational axis and the second rotational axis at the same distance d from the central axis, both the first gear portion and the second gear portion can be manipulated by the single driving gear portion.

By including the constraining portion, the positions of the first valve and second valve can be easily controlled without using a hole sensor.

By including the inner intake opening and the fragrance sheet in the cover, fragrance can be added efficiently to both the air passing through the bypass flow path and the filtering flow path.

By including the auxiliary filter, a filtering function can be added to both the bypass flow path and the filtering flow path.

Figure 1:
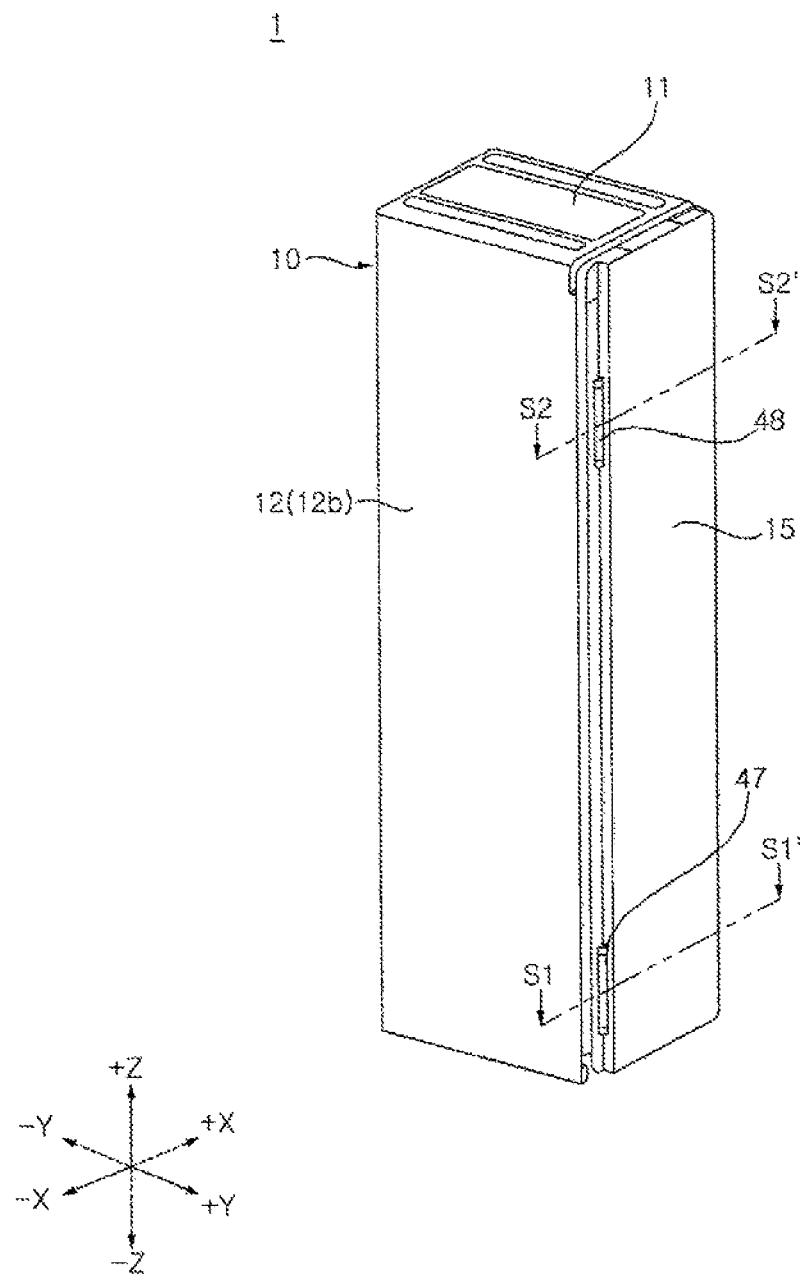
FIG. 1 is a perspective view of a clothes treatment apparatus 1 according to an exemplary embodiment of the present disclosure.
Figure 4:
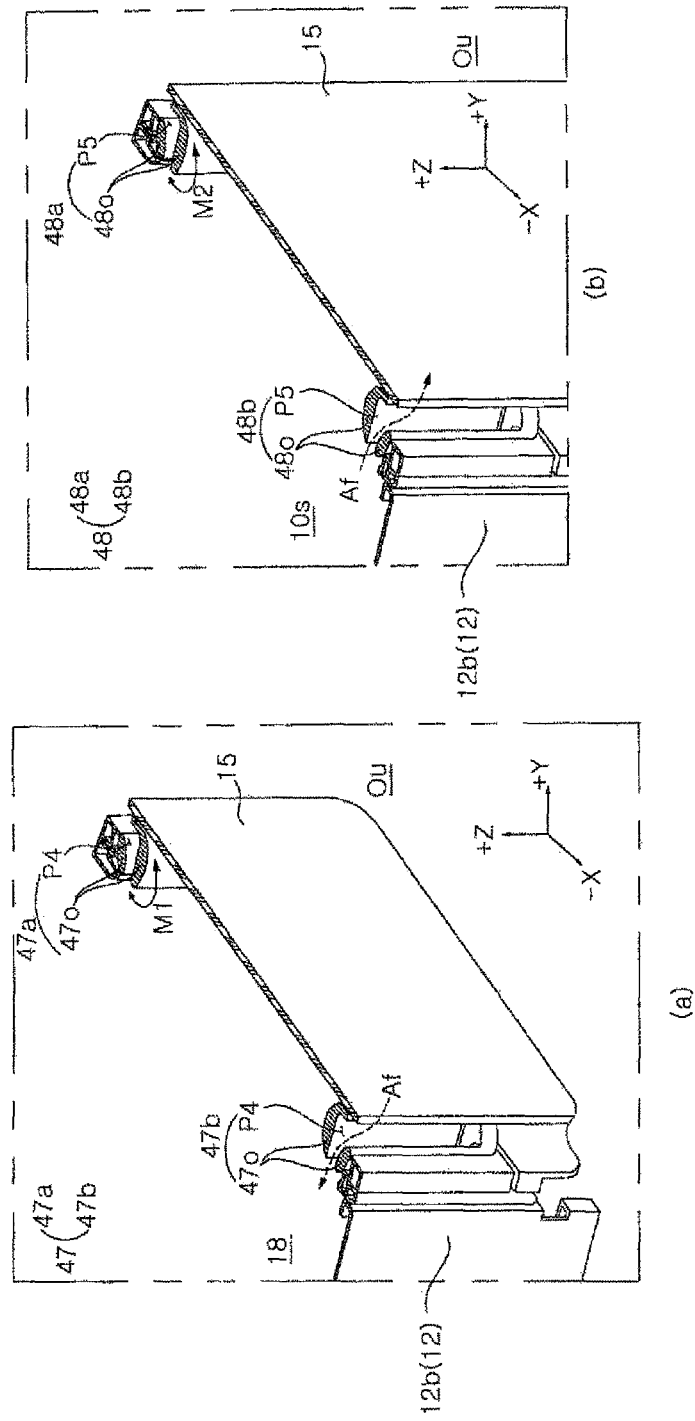

(a) of FIG. 4 is a horizontal cross-sectional perspective view of the clothes treatment apparatus 1 of FIG. 1, taken along the line S1-S1', and (b) of FIG. 4 is a horizontal cross-sectional perspective view of the clothes treatment apparatus 1 of FIG. 1, taken along the line S2-S2'.

Figure 5:
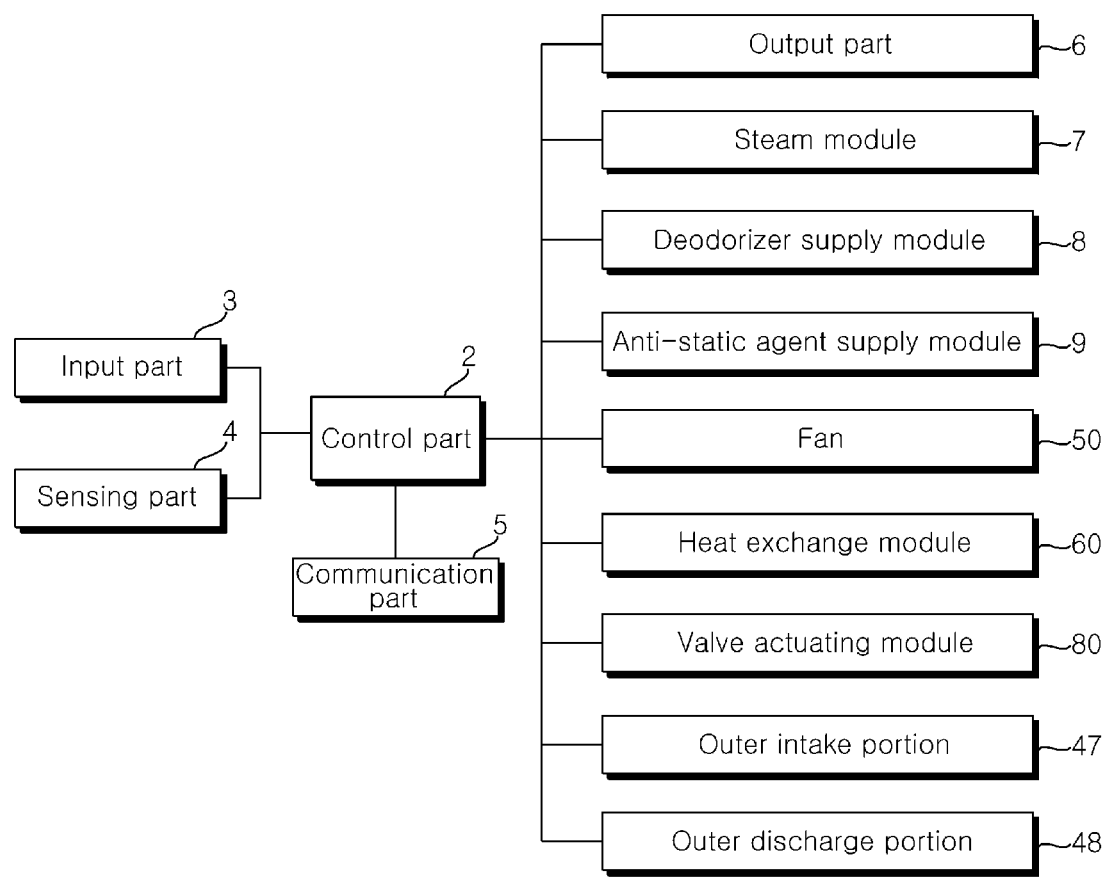

FIG. 5 is a control block diagram of the clothes treatment apparatus 1 of FIG. 1.

Figure 6A:
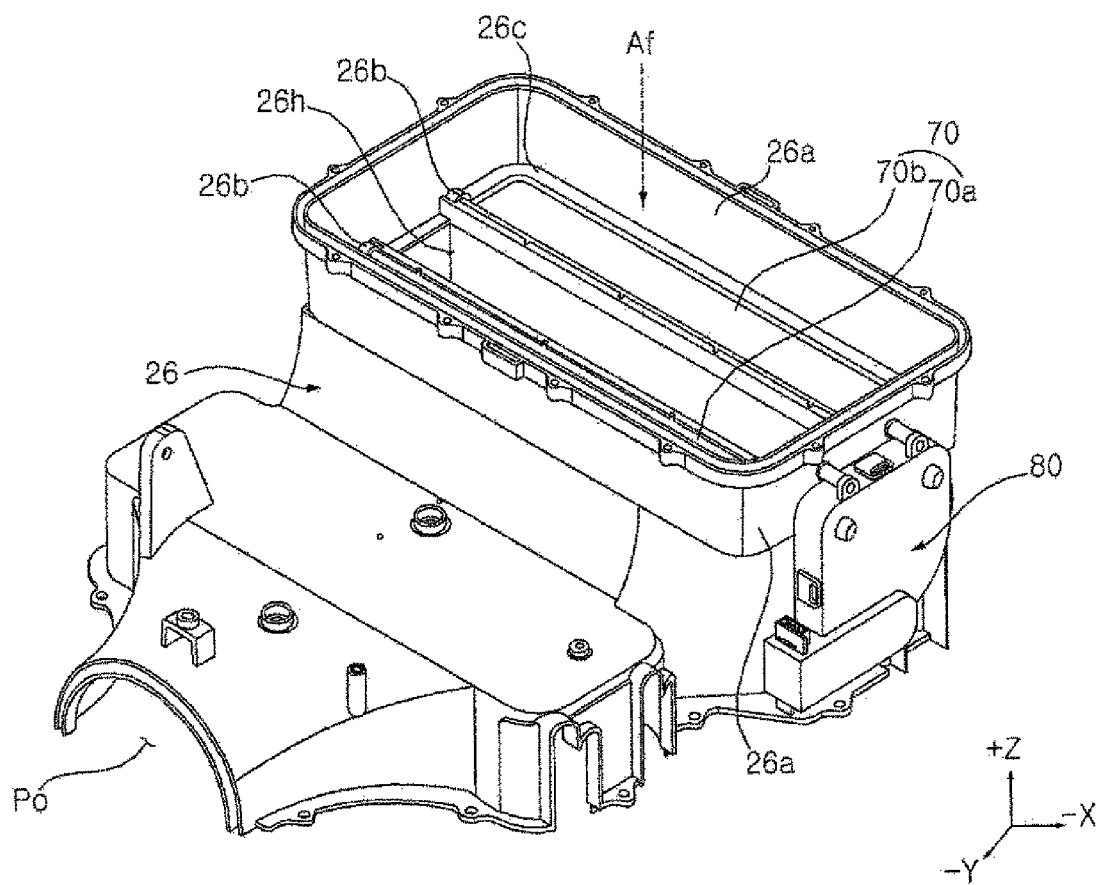
Figure 6B:
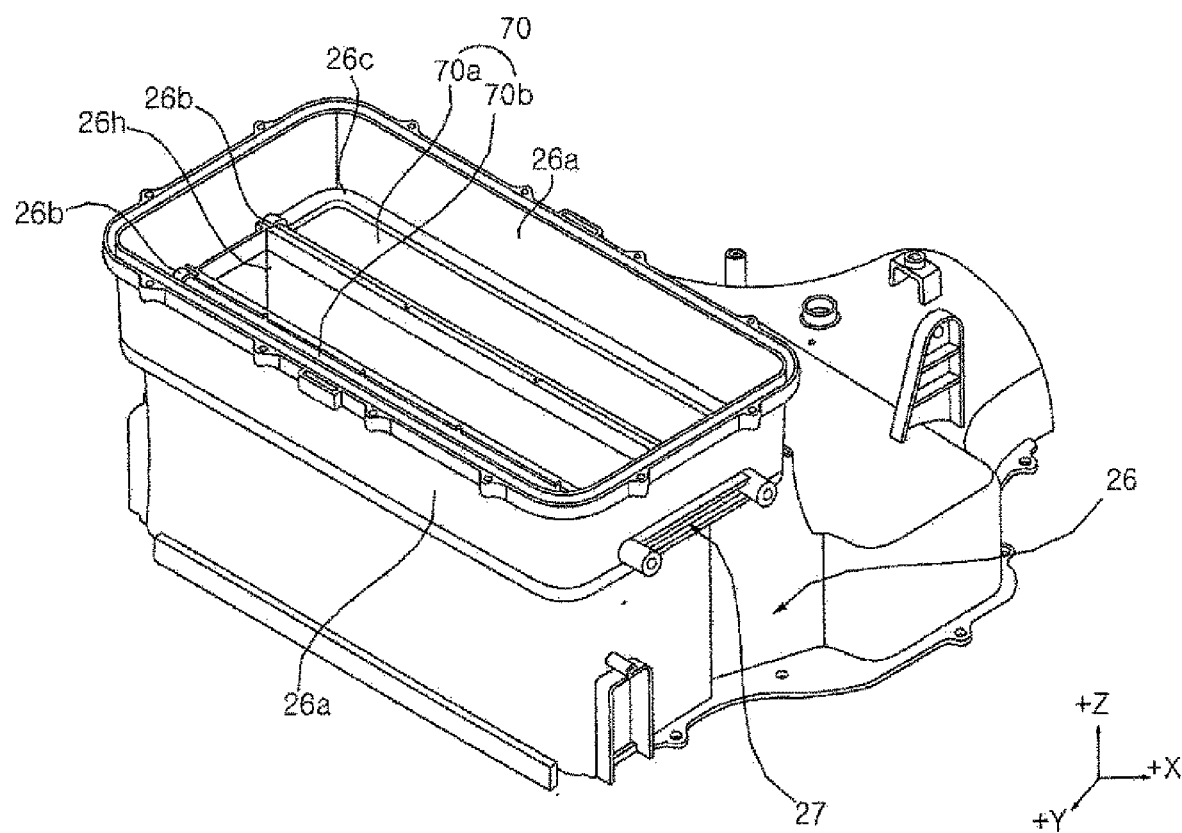

FIGS. 6a and 6b are perspective views showing part of the flow path body 26 disposed within the machine room 18 of the clothes treatment apparatus 1 of FIG. 1, which illustrate the valve 70 and valve actuating module 80 disposed on the flow path body 26.

Figure 7:
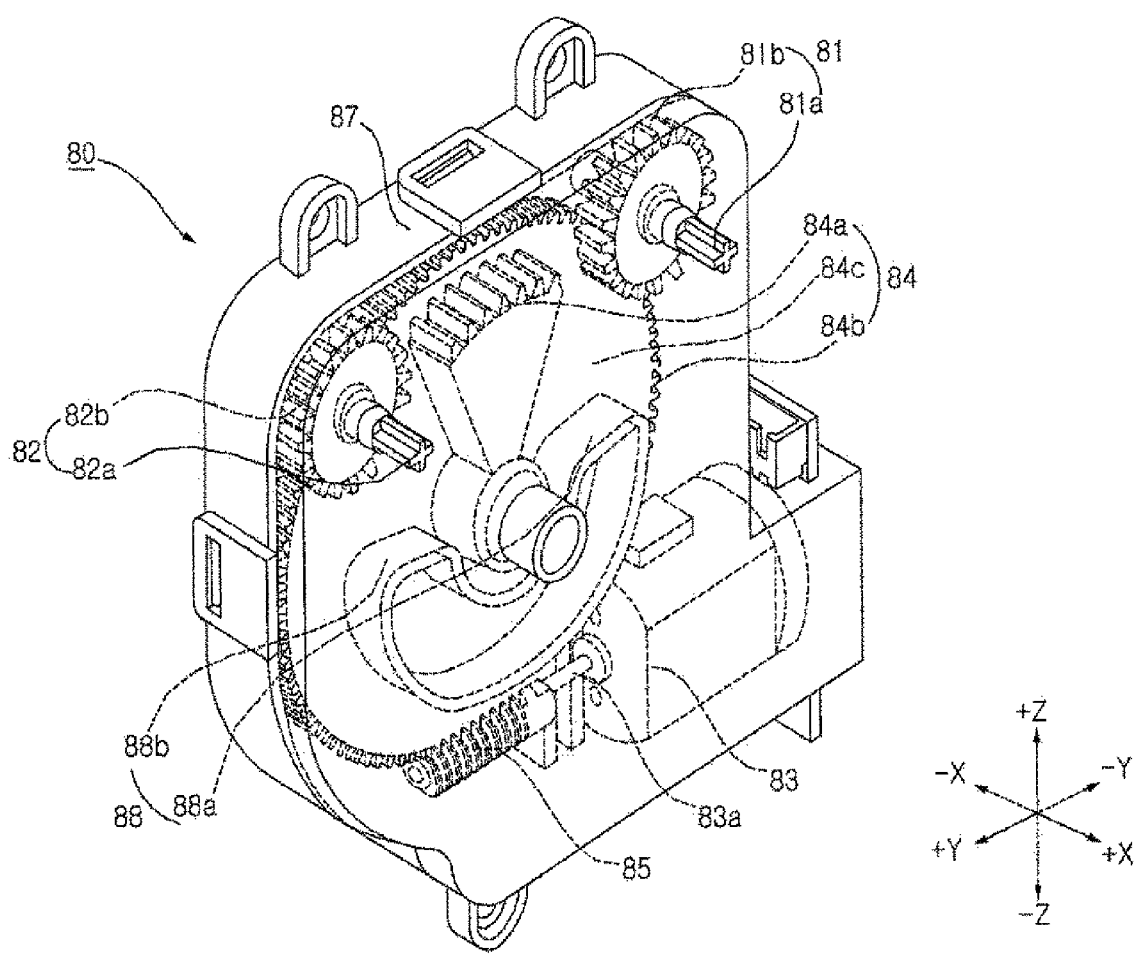

FIG. 7 is an interior perspective projection view of the valve actuating module 80 of FIG. 6a.

Figure 8A:
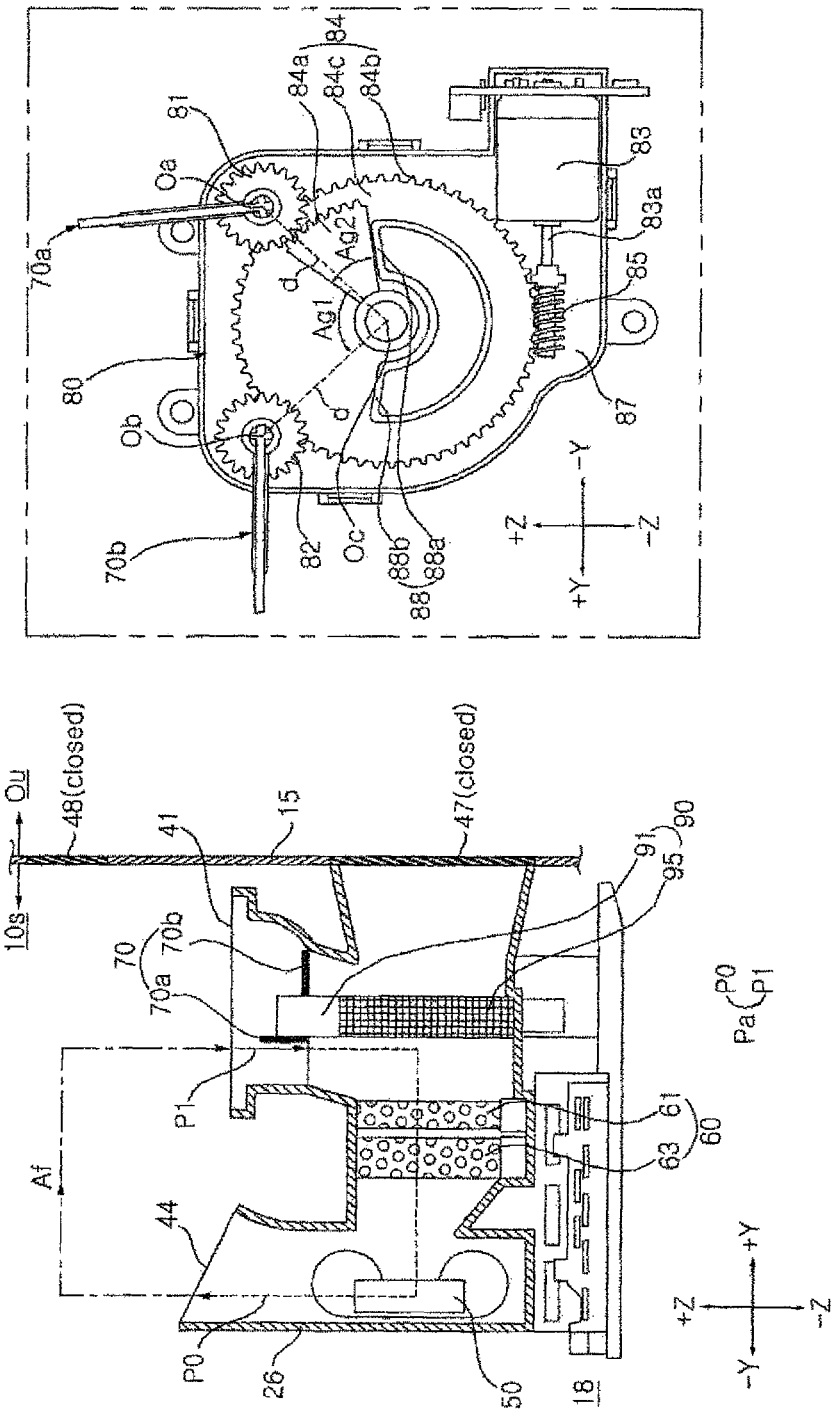
Figure 8B:
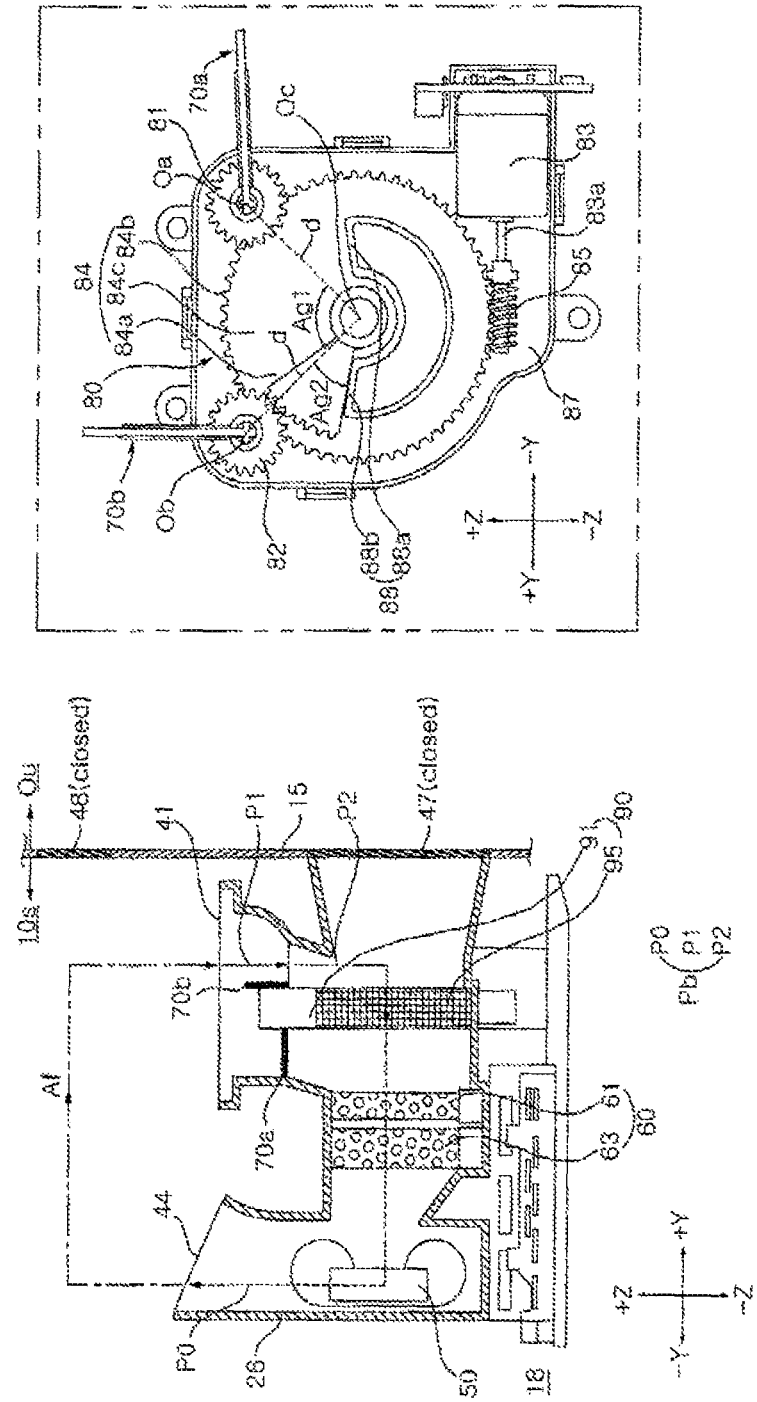
Figure 8C:
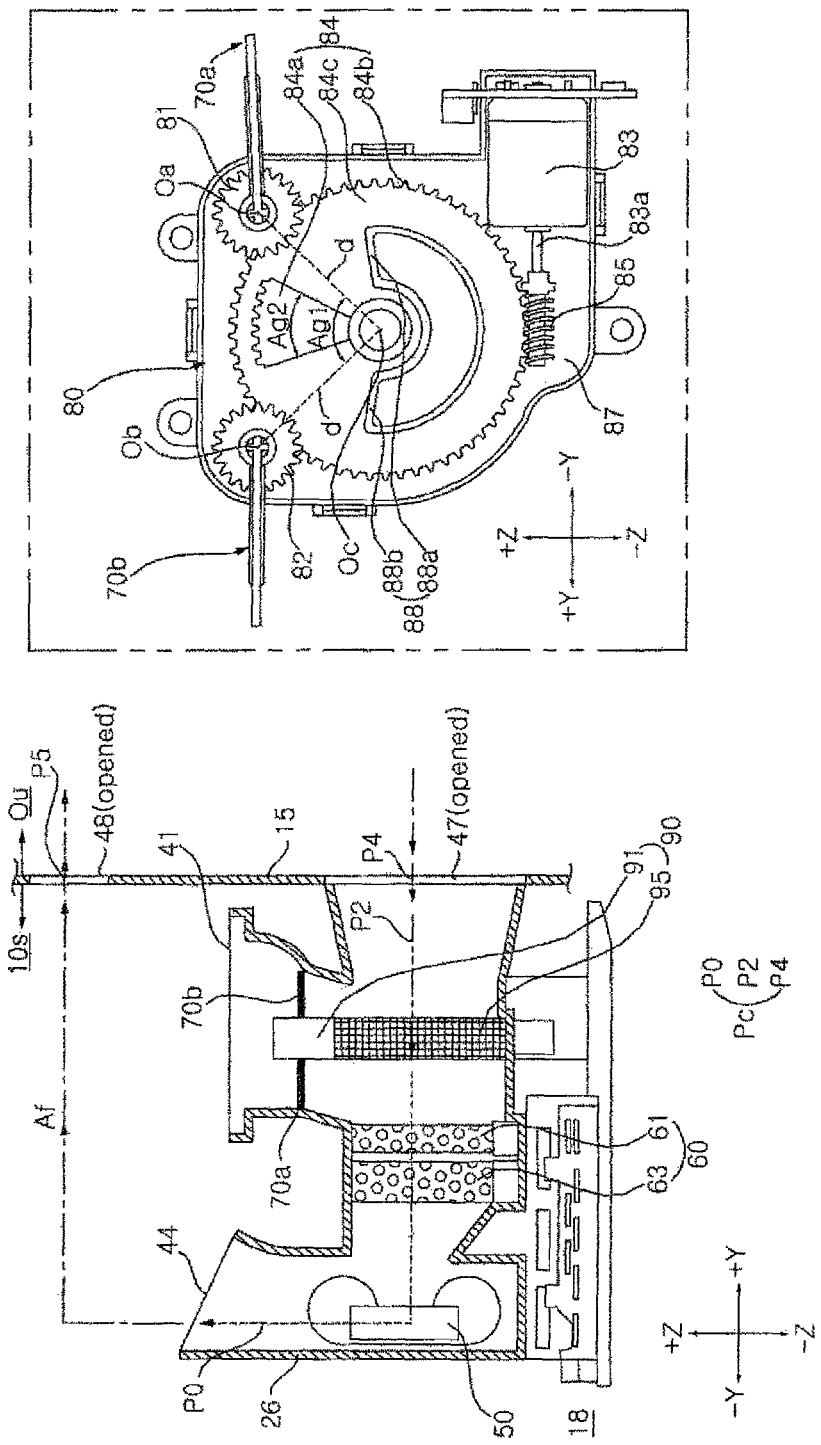

FIGS. 8a to 8c are views showing the working mechanism of the valve 70 and valve actuating module 80 disposed on the flow path body 26 of FIGS. 6a and 6b, each illustrating a vertical cross-sectional conceptual diagram of the flow path body 26 and door 15 on the left side and an interior elevation view of the operating state of the valve actuating module 80 on the right side: FIG. 8a shows that the bypass circulation flow path Pa is selected; FIG. 8b shows that the filtering circulation flow path Pb is selected; and FIG. 8c shows that the ventilation flow path Pc is selected.

Figure 3:
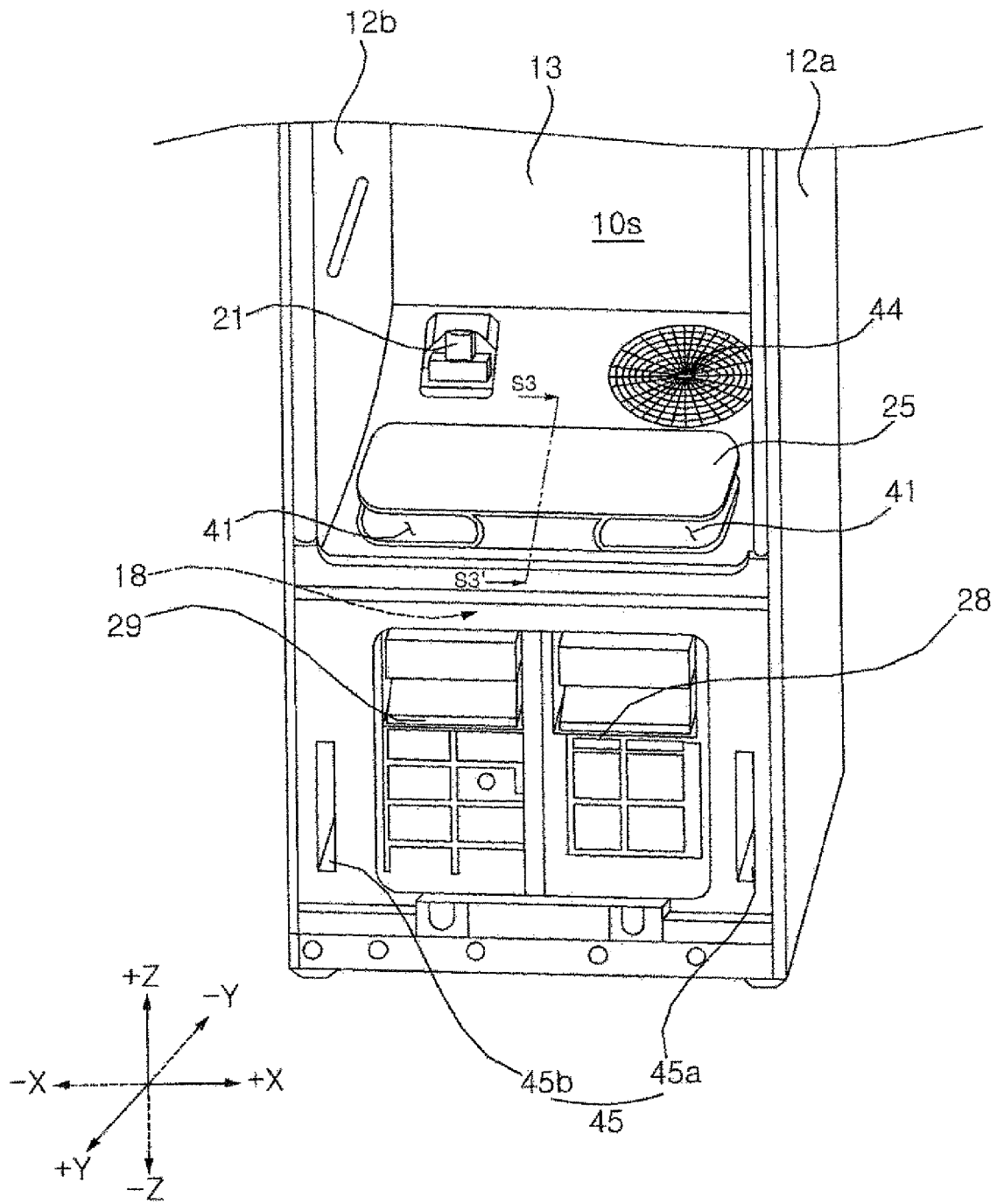
FIG. 3 is a partial perspective view showing part of the treatment space 10s of the clothes treatment apparatus 1 of FIG. 2.
Figure 9:
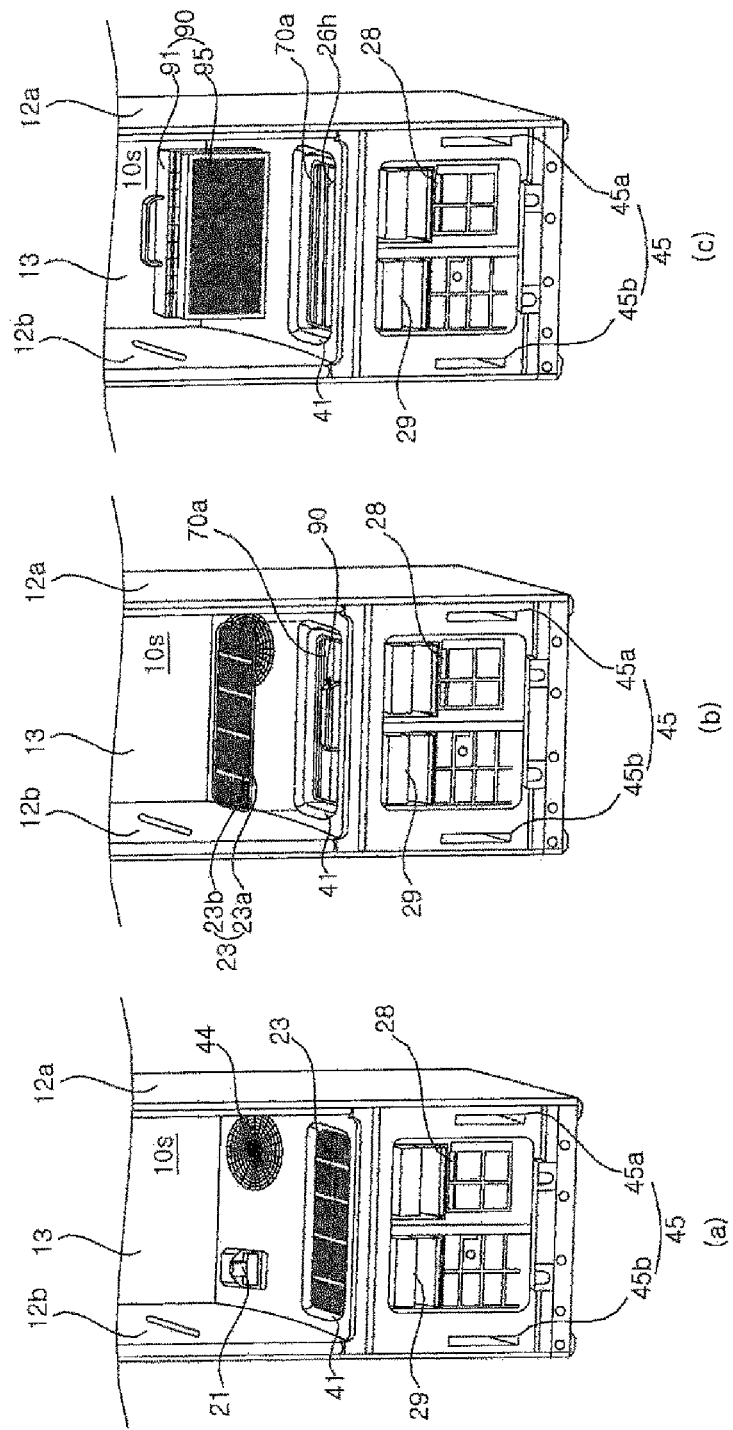

FIG. 9 is a partial perspective view showing a process in which the cover 25, auxiliary filter 23, and filter module 90 are removed from the cabinet 10 of the clothes treatment apparatus 1 of FIG. 3: (a) of FIG. 9 shows the cover 25 being removed from the cabinet 10; (b) of FIG. 9 shows the auxiliary filter 23 being removed; and (c) of FIG. 9 shows the filter module 90 being removed.

Figure 10:
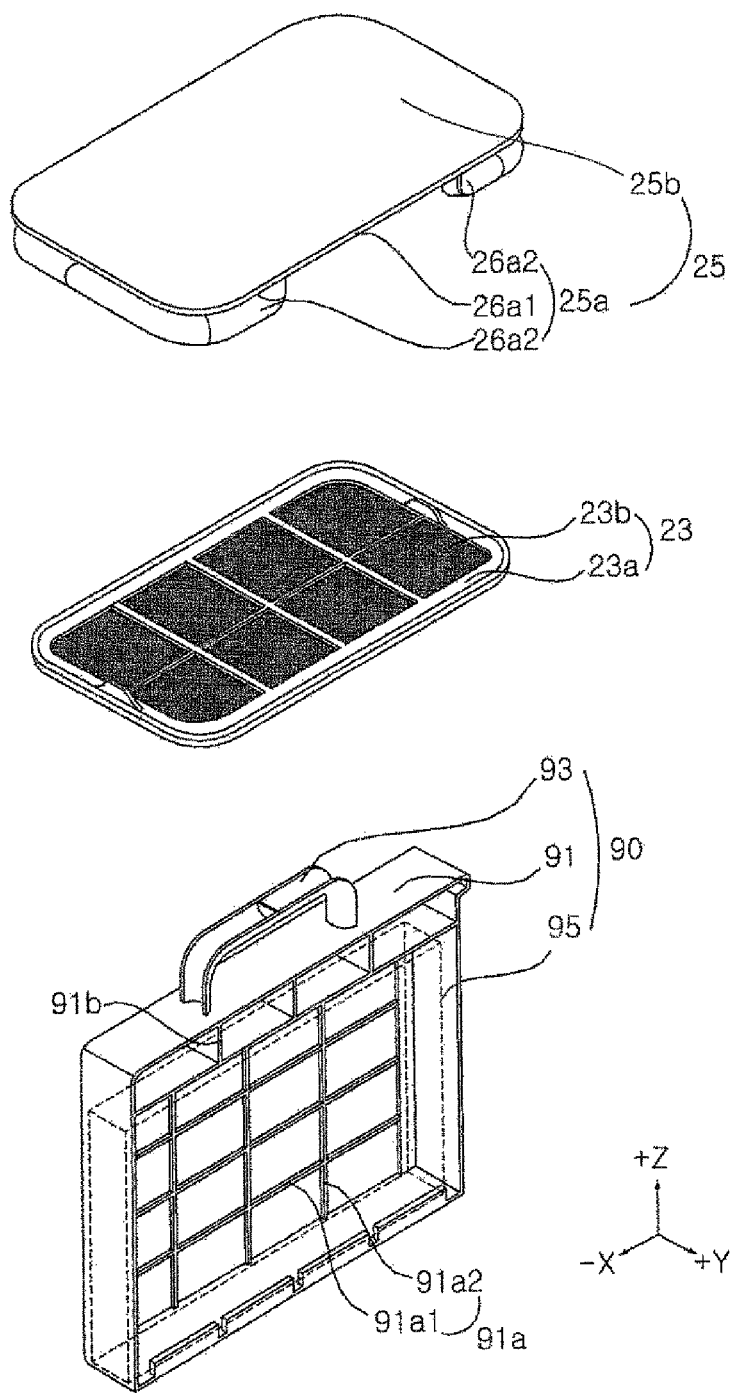

FIG. 10 is a perspective view of the cover 25, auxiliary filter 23, and filter module 90 of FIGS. 3 and 9.

Figure 11:
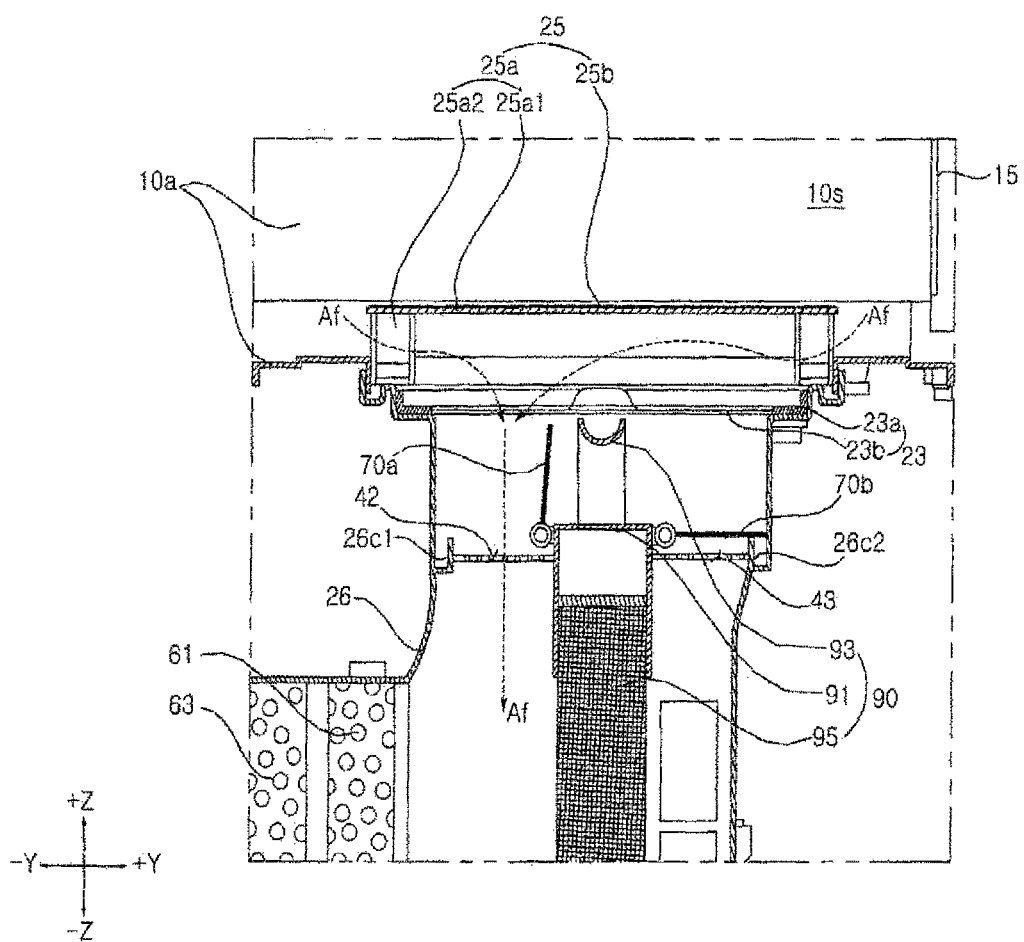

FIG. 11 is a partial cross-sectional view of the clothes treatment apparat 1 of FIG. 3, taken vertically along the line S3-S3'.

Figure 12:
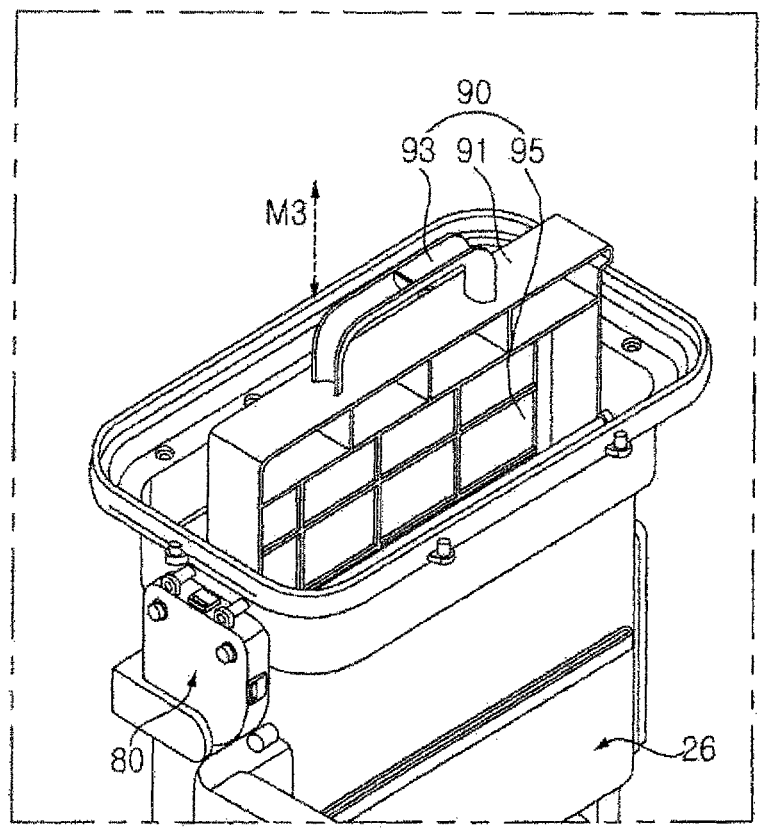

FIG. 12 is a perspective view showing the filter module 90 being pushed into or pulled out from the flow path body 26 of FIGS. 6a and 6b.

MODE FOR DISCLOSURE

To explain the present disclosure, a description will be made below with respect to a spatial orthogonal coordinate system where X, Y, and Z axes are orthogonal to each other. Each axis direction (X-axis direction, Y-axis direction, and Z-axis direction) refers to two directions in which each axis runs. Each axis direction with a '+' sign in front of it (+X-axis direction, +Y-axis direction, and +Z-axis direction) refers to a positive direction which is one of the two directions in which each axis runs. Each axis direction with a '−' sign in front of it (−X-axis direction, −Y-axis direction, and −Z-axis direction) refers to a negative direction which is the other of the two directions in which each axis runs.

The terms mentioned below to indicate directions such as "front(+Y)/back(−Y)/left(+X)/right(−X)/up(+Z)/down(−Z)" are defined by the X, Y, and Z coordinate axes, but they are merely used for a clear understanding of the present disclosure, and it is obvious that the directions may be defined differently depending on where the reference is placed.

The terms "upstream" and "downstream" mentioned in the description below are defined with respect to the direction of a preset air flow.

The terms with ordinal numbers such as "first", "second", "third", etc. added to the front are used to describe constituent elements mentioned below, are intended only to avoid confusion of the constituent elements, and are unrelated to the order, importance, or relationship between the constituent elements. For example, an embodiment including only a second component but lacking a first component is also feasible.

The singular forms used herein are intended to include plural forms as well, unless the context clearly indicates otherwise.

A clothes treatment apparatus 1 according to an exemplary embodiment of the present disclosure comprises a cabinet 10 placed on a floor on the outside or fixed to a wall on the outside. The cabinet 10 forms a treatment space 10s for storing clothes. The clothes treatment apparatus 1 may comprise a hanger module 30 provided to hang clothes or clothes hangers. The clothes treatment apparatus 1 has an air flow path P for supplying air to clothes. The clothes treatment apparatus 1 comprises a fan 50 for moving the air in the air flow path P. The clothes treatment apparatus 1 may comprise a heat exchange module 60 for heating or cooling air passing through it. The clothes treatment apparatus 1 comprises at least one valve 70 disposed on the air flow path P. The clothes treatment apparatus 1 comprises a valve actuating module 80 for actuating the valve 70.

The clothes treatment apparatus 1 may comprise a filter module 90 having a filter portion 95 for filtering out dust from air passing therethrough. The clothes treatment apparatus 1 may further comprise an auxiliary filter 23 having a different function from the filter module 90.

The clothes treatment apparatus 1 comprises a control part 2 for controlling various components. The control part 2 allows to select one of the plurality of flow paths.

Figure 2:
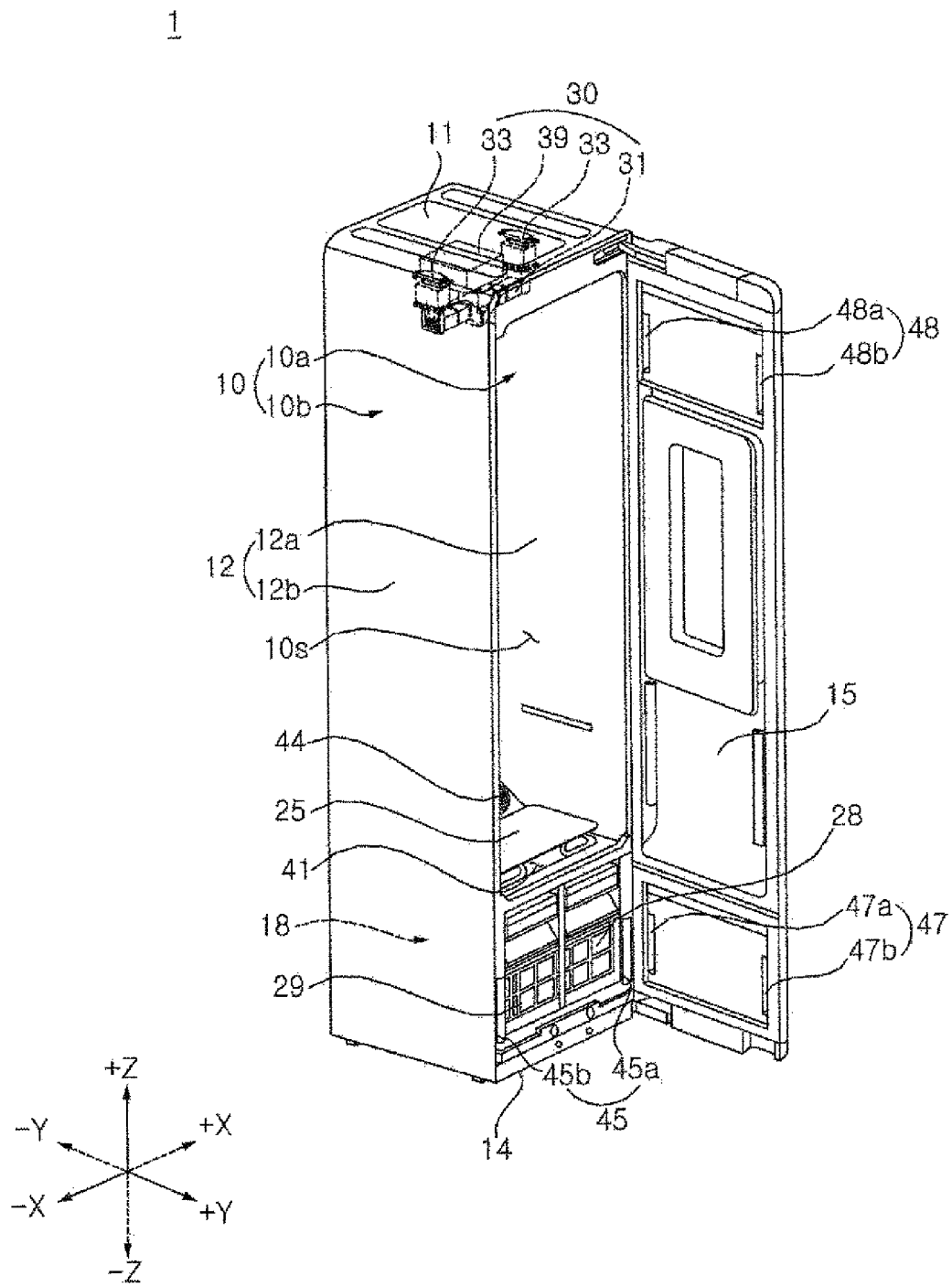
FIG. 2 is a perspective view of the clothes treatment apparatus 1 of FIG. 1 when the door 15 is open.

Referring to FIGS. 1 to 3, the cabinet 10 forms the external appearance. The cabinet 10 comprises a top panel 11 forming the top side, side panels 12 forming the left and right sides, and a rear panel 13 forming the rear side. The cabinet 10 comprises a base 14 forming the bottom side. The side panels 12 may comprise a first side panel 12a forming the left side and a second side panel 12b forming the right side.

The cabinet 10 comprises an interior cabinet 10a forming the inner side. The cabinet 10 comprises an exterior cabinet 10b forming the outer side.

The cabinet 10 comprises a door 15 for putting clothes in the treatment space 10s. The door 15 may open or close an open side of the treatment space 10s. The door 15 may open or close the treatment space 10s as it swings on a predetermined rotational axis that extends vertically. When the door 15 closes, the treatment space 10s is separated from the outside, and when the door 15 opens, the treatment space 10s is exposed to the outside. The door 15, in a closed state, may cover an external air connector 45 to be described later. The door 15, in a closed state, may cover a condensate storage portion 28 and a feed-water storage portion 29.

The interior cabinet 10a and the inner side of the door 15 define the treatment space 10s. The treatment space 10s is a space in which air (for example, hot air), steam, a deodorizer, and/or an anti-static agent is applied to clothes so as to change physical or chemical properties of the clothes. Clothes treatment may be done on the clothes in the treatment space 10s by various methods.

For example, hot air may be applied to the clothes in the treatment space 10s to dry the clothes. Also, steam may be provided to the clothes in the treatment space 10s to remove wrinkles on the clothes. The air and/or steam provided into the treatment space 10s affects the physical or chemical properties of the clothes. The tissue structure of the clothes is relaxed by hot air or steam, so that the wrinkles are smoothed out, and an unpleasant odor is removed as odor molecules trapped in the clothes react with steam. In addition, the hot air and/or steam may sterilize bacteria present in the clothes.

For example, dust may be removed from the clothes in the treatment space 10s by air circulation or filtering. Moreover, air from outside the cabinet 10 may be supplied to the clothes so as to dehumidify the clothes in the treatment space 10s or to remove smells from the clothes. In addition, a deodorizer may be sprayed to the clothes in the treatment space 10s to add fragrance to the clothes, or an anti-static agent may be sprayed to the clothes to prevent static cling on them.

The cabinet 10 has a machine room 18 for treating the air provided into the treatment space 10s. The machine room 18 may be disposed under the treatment space 10s. A flow path body 26, the fan 50, and the heat exchange module 60 may be disposed within the machine room 18. The valve 70 and the valve actuating module 80 may be disposed within the machine room 18.

The filter module 90 may be disposed within the machine room 18. The filter module 90 may be disposed in such a way as to be pulled out from inside the machine room 18. With the filter module 90 being disposed within the machine room 18, a cover 25 for covering the filter module 90 may be placed. Also, the auxiliary filter 23 may be removably placed between the cover 25 and the filter module 90.

Referring to FIG. 2, the hanger module 30 may be disposed above the treatment space 10s. The hanger module 30 is supported by the cabinet 10. The hanger module 30 may be movable.

The hanger module 30 comprises a hanger body 31 provided to hang clothes or clothes hangers. In an example, the hanger body 31 may be formed with locking grooves (not shown) for hanging clothes hangers. In another example, the hanger body 31 may be formed with hooks (not shown) or the like so that clothes are hung directly on them.

The hanger body 31 may be connected to the cabinet 10 through a hanger moving portion 33. The hanger body 31 may vibrate in a predetermined vibration direction (+X, −X). The hanger body 31 may extend longitudinally in the vibration direction (+X, −X). A plurality of locking grooves (not shown) may be disposed on the upper side of the hanger body 31, spaced apart from each other, in the vibration direction (+X, −X). The locking grooves may extend in a direction (+Y, −Y) intersecting the vibration direction (+X, −X).

The hanger module 30 may comprise a hanger moving portion 33 which movably supports the hanger body 31. The hanger moving portion 33 is movable in the vibration direction (+X, −X). The hanger moving portion 33 may be made of a flexible material so as to make the hanger body 31 move. The hanger moving portion 33 may comprise an elastic member that is elastically deformable when the hanger body 31 moves. The upper edge of the hanger moving portion 33 is fixed to the cabinet 10, and the lower edge is fixed to the hanger body 31. The hanger moving portion 33 may extend vertically.

The hanger module 30 may comprise a vibration unit 39 for generating vibration. The vibration unit 39 is connected to the hanger body 31 to transmit vibrations from the vibration unit 39 to the hanger body 31. The vibration unit 39 may be disposed over the hanger body 31. For example, the hanger body 31 may be formed with a slit (not shown) extending in a direction (+Y, −Y) orthogonal to the vibration direction (+X, −X), and the vibration unit 39 may comprise a protruding portion (not shown) that protrudes downward and is inserted into the slit. The protruding portion of the vibration unit 39, while inserted in the slit of the hanger body 31, moves relative to the slit in the orthogonal direction (+Y, −Y), thereby transmitting excitation force to the hanger body 31 only in the vibration direction (+X, −X).

Referring to FIGS. 8a to 8c, an air flow path P directs air to be discharged into the treatment space 10s. The air flow path P has a plurality of preset flow paths for directing air to be discharged into the treatment space 10s. One of the plurality of preset flow paths may be selected by the valve actuating module 80 and the valve 70. The clothes treatment apparatus 1 comprises a flow path body 26 that marks off the air flow path P. The flow path body 26 may be disposed within the machine room 18.

Referring to FIGS. 1 to 4, an inner intake opening 41 is provided to draw in air from inside the treatment space 10s. The inner intake opening 41 is disposed on the interior cabinet 10a. The inner intake opening 41 may be disposed at the bottom side of the interior cabinet 10a. The inner intake opening 41 may be located between the cover 25 and the interior cabinet 10a. The air in the treatment space 10s may be admitted into the air flow path P through the inner intake opening 41.

An inner discharge opening 44 is provided to discharge air into the treatment space 10s. The inner discharge opening 44 is disposed on the interior cabinet 10a. The inner discharge opening 44 may be disposed at the bottom side of the interior cabinet 10a. The inner discharge opening 44 may have a radial web structure. The air in the air flow path P may be discharged into the treatment space 10s through the inner discharge opening 44.

While circulation flow paths Pa and Pb to be described later are selected, the air drawn into the air flow path P from the treatment space 10s through the inner intake opening 41 is discharged to the treatment space 10s through the inner discharge opening 44 after going through a certain treatment. In this exemplary embodiment, the inner intake opening 41 and the inner discharge opening 44 are disposed respectively at the front and rear of the bottom of the treatment space 10s.

An outside air inlet section P4 may be provided to draw in air from an outer space Ou of the cabinet 10. The air in the outer space Ou may be admitted into the air flow path P through the outside air inlet section P4. The outside air inlet section P4 may be formed in the shape of a hole. The outside air inlet section P4 may be disposed on the door 15. The outside air inlet section P4 constitutes an upstream end of a ventilation flow path Pc to be described later. The outside air inlet section P4 may be configured to open and close.

While the ventilation flow path Pc to be described later is selected, air drawn into the air flow path P from the outer space Ou through the outside air inlet section P4 may be discharged to the treatment space 10s through the inner discharge opening 44 after going through a certain treatment.

An exhaust air outlet section P5 may be provided to discharge air to the outer space Ou of the cabinet 10. The air in the treatment space 10s may be discharged to the outer space Ou through the exhaust air outlet section P5. The exhaust air outlet section P5 may be formed in the shape of a hole. The exhaust air outlet section P5 may be disposed at the door 15. The exhaust air outlet section P5 may be disposed between the treatment space 10s and the outer space Ou. The exhaust air outlet section P5 constitutes a flow path connecting the treatment space 10 and the outer space Ou. The exhaust air outlet section P5 may be configured to open and close.

While the door 15 is closed, air that has passed through the outside air inlet section P4 is admitted into the machine room 15 through an outside air connecting port 45. The outside air connecting port 45 may open toward the backside of the door 15. The outside air connecting part 45 is formed in a position corresponding to a downstream end of the outside air connecting port 45 while the door 15 is closed. After sequentially passing through the outside air inlet section P4 and the outside air connecting port 45, the air is admitted into the flow path body 26. Specifically, the air that has passed through the outside air connecting port 45 may be admitted into a filter pass-through section P2.

The outside air connecting port 45 is disposed under the treatment space 10s. The door 15 covers the outside air connecting port 45 while the door 15 is closed. The outside air connecting port 45 may be formed on a side of the machine room 18 facing the door 15. The outside air connecting port 45 may be disposed at the front of the machine room 18. The outside air connecting port 45 may be exposed while the door 15 is open.

A first outside air connecting port 45a and a second outside air connecting port 45b may be provided corresponding to a first outer intake portion 47a and second outer intake portion 47b disposed on the door 15. The first outside air connecting port 45a and the second outside air connecting port 45b may be disposed symmetrically on the left and right. The first outside air connecting port 45a and the second outside air connecting port 45b may be disposed with the condensate storage portion 28 and feed-water storage portion 29 in between.

The clothes treatment apparatus 1 may comprise an outer intake portion 47 forming the outside air inlet section P4. The outer intake portion 47 may be disposed on the door 15. The outer intake portion 47 may open or close the outside air inlet section P4. The outer intake portion 47 may open or close the outside air inlet section P4 by rotating relative to the door 15 in a predetermined rotation direction M1. The outer intake portion 47 may be rotatable relative to the door 15 on a predetermined rotational axis that extends vertically. A driving portion (not shown) for actuating the outer intake portion 47 may be disposed inside the door 15.

A plurality of outer intake portions 47a and 47b may be provided. In this exemplary embodiment, the first outer intake portion 47a and the second outer intake portion 47b are disposed on two opposite sides of the door 15. The plurality of outer intake portions 47a and 47b may be configured to open or close simultaneously.

Referring to (a) of FIG. 4, the outer intake portion 47 may comprise an open-close portion 47o defining the outside air inlet section P4. The outside air inlet section P4 is formed through the open-closed portion 47o. The open-close portion 47o is rotatable relative to the door 15. An intake hole corresponding to the outside air inlet section P4 may be formed on the outer side of the door 15. Referring to the arrow Af in (a) of FIG. 4, when the open-close portion 47o rotates and therefore an upstream end of the outside air inlet section P4 matches the intake hole of the door 15, the air in the outer space Ou may be admitted into the machine room 18 through the outside air inlet section P4.

The clothes treatment apparatus 1 may comprise an outer discharge portion 48 forming the exhaust air outlet section P5. The outer discharge portion 48 may be disposed on the door 15. The outer discharge portion 48 may open or close the exhaust air outlet section P5. The outer discharge portion 48 may open or close the exhaust air outlet section P5 by rotating relative to the door 15 in a predetermined rotation direction M2. The outer discharge portion 48 may be rotatable relative to the door 15 on a predetermined rotational axis that extends vertically. A driving portion (not shown) for actuating the outer discharge portion 48 may be disposed inside the door 15.

A plurality of outer discharge portions 48a and 48b may be provided. In this exemplary embodiment, the first outer discharge portion 48a and the second outer discharge portion 48b are disposed on two opposite sides of the door 15. The plurality of outer discharge portions 48a and 48b may be configured to open or close simultaneously.

The outer discharge portion 48 is disposed above the outer intake portion 47. The outer discharge portion 48 and the outer intake portion 47 may be configured to open and close simultaneously.

Referring to (b) of FIG. 4, the outer discharge portion 48 may comprise an open-close portion 48o defining the exhaust air outlet section P5. The exhaust air outlet section P5 is formed through the open-close portion 48o. The open-close portion 48o is rotatable relative to the door 15. A discharge hole may be formed on the outer side of the door 15. Referring to the arrow Af in (b) of FIG. 4, when the open-close portion 48o rotates and therefore a downstream end of the exhaust air inlet section P5 matches the discharge hole of the door 15, the air in the treatment space 10s may be discharged to the outer space Ou through the exhaust air outlet section P5.

Referring to FIGS. 8a to 8c, the fan 50 exerts pressure on the air in the air flow path P. The fan 50 is disposed on the air flow path P. The fan 50 is disposed within the flow path body 26. The fan 50 is disposed in a shared section P0 to be described later. Through this, whichever one of the plurality of flow paths is selected may direct the flow of air in the air flow path P by means of the single fan 50.

The fan 50 may be disposed at the rear of the flow path body 26. The fan 50 may be located closer to the inner discharge opening 44 than to the inner intake opening 41. The shared section P0 forms a flow path directing the flow of air from the front to the rear and then forms a flow path directing the flow of air to the inner discharge opening 44 as it is bent upward. The fan 50 may be disposed at a point where the shared section is bent upward. The fan 50 may be implemented as a centrifugal fan.

Referring to FIGS. 8a to 8c, the heat exchange module 60 is disposed on the air flow path P. The heat exchange module 60 is disposed within the flow path body 26. The heat exchange module 60 is disposed in the shared section P0 to be described later. Through this, whichever one of the plurality of flow paths is selected may treat the air in the air flow path P by means of the single heat exchange module 60.

The heat exchange module 60 may heat the air in the air flow path P. Specifically, the heat exchange module may comprise a first heat exchanger 61 functioning as an evaporator and a second heat exchanger 63 functioning as a condenser. The heat exchange module 60 may comprise a compressor (not shown) and an expansion valve (not shown). The heat exchange module 60 may have a refrigerant cycle in which refrigerant sequentially travels through the compressor, the condenser, the expansion valve, and the evaporator. As the air in the air flow path P passes through the first heat exchanger 61 first, the moisture in the air is condensed, and the air passes through the second heat exchanger 63, it is heated because its heat capacity has decreased due to the generation of condensate. Thus, the air has a lower humidity and higher temperature after it has passed through the second heat exchanger 63, as compared to before the air passes through the first heat exchanger 61.

Although not shown, in another exemplary embodiment, the heat exchange module 60 may comprise a cooling device for making treated air cooler than before the treatment.

The operation of the heat exchange module 60 may be controlled by the control part 2. By operating the fan 50 while the heat exchange module 60 is not operating, air not treated with heat while flowing through the air flow path P may be supplied into the treatment space 10s.

Referring to FIGS. 2 and 3, the clothes treatment apparatus 1 may comprise a condensate storage portion 28 for storing condensate generated in the heat exchange module 60. Condensate generated in the first heat exchanger 61 of the heat exchange module 60 may be collected into the condensate storage portion 28. The condensate storage portion 28 may be pulled out. The condensate storage portion 28 may be pulled forward while the door 15 is open.

The clothes treatment apparatus 1 may comprise a steam module 7 for supplying steam into the treatment space 10s. The steam module 7 may comprise a steam generator (not shown) for generating steam and a steam spout 21 for discharging generated steam into the treatment space 10s. The steam generator may be disposed within the machine room 18. The steam spout 21 is disposed in the interior cabinet 10a. In this exemplary embodiment, the steam spout 21 is disposed at the rear of the bottom side of the treatment space 10s.

The clothes treatment apparatus 1 may comprise a feed-water storage portion 29 for storing water to be supplied to the steam module 7. The water in the feed-water storage portion 29 may be moved to the steam generator and changed into steam. The feed-water storage portion 29 may be pulled out. The feed-water storage portion 29 may be pulled forward while the door 15 is open.

Referring to FIG. 5, the clothes treatment apparatus 1 may comprise an input part 3 for receiving On/Off and other various commands. The input part 3 may comprise a key, a button, a dial, and/or a touchscreen.

The clothes treatment apparatus 1 may comprise a sensing part 4 for sensing environment information for clothes treatment. The environment information may include information about clothes contained in the treatment space 10s. The environment information may include information about the state of air in the treatment space 10s. The environment information may include information about the state of air in the air flow path P. The environment information may include information about the state of air in the outer space Ou.

The air state information may comprise temperature information. The air state information may comprise humidity information. The air state information may comprise air pollution information.

For example, the sensing part 4 may comprise a clothes recognition sensor (not shown) for sensing clothes contained inside the treatment space 10s. The sensing part 4 may comprise a humidity sensor (not shown) for sensing air humidity. The sensing part 4 may comprise a temperature sensor (not shown) for sensing air temperature. The humidity sensor and the temperature sensor may be implemented as a temperature and humidity sensor which senses both humidity and temperature at the same time.

The clothes treatment apparatus 1 may comprise a communication part 5 provided to communicate with an external server, terminal, and/or charging stand.

The clothes treatment apparatus 1 may comprise an output part 6 for delivering various information to the user. The output part 6 may comprise a speaker and/or a display.

The clothes treatment apparatus 1 may further comprise a deodorizer supply module 8 for supplying a deodorizer into the treatment space 10s. The clothes treatment apparatus 1 may further comprise an anti-static agent supply module 9 for supplying an anti-static agent into the treatment space 10s.

The control part 2 may receive information from the input part 3 and process it. The control part 2 may receive or send information through the communication part 5. The control part 2 may control various components 6, 7, 8, 9, 50, 60, 80, 47, and 48 based on information received through the input part 3 or communication part 5.

The control part 2 may receive sensed environment information from the sensing part 4 and process it. The control part 2 may control various components 6, 7, 8, 9, 30, 50, 60, 80, 47, and 48 based on the environment information sensed by the sensing part 4. For example, the control part 2 may control the clothes treatment apparatus 1 to select a ventilation mode to be described later, based on environment information that the humidity of the air in the outer space Ou is lower than the humidity of the air in the treatment space 10s.

The control part 2 may control the output of the output part 6. The control part 2 may control the operation of the steam module 7. The control part 2 may control the operation of the deodorizer supply module 8. The control part 2 may control the operation of the anti-static agent supply module 9. The control part 2 may control the operation of the fan 50. The control part 2 may control the operation of the heat exchange module 60. The control part 2 may control the vibration of the hanger module 30.

The control part 2 may control the operation of the valve actuating module 80. The control part 2 may control the valve actuating module 80 so as to select one of the plurality of flow paths (see FIGS. 8a to 8c). The control part 2 may operate the valve actuating module 80 to change from one of the plurality of flow paths to another.

When the valve 70 is actuated by the valve actuating module 80, the "selected flow path" among the plurality of flow paths is changed. The selected flow path as used herein refers to one of the plurality of flow paths selected in the current mode. For example, the selected flow path in FIG. 8a is a bypass circulation flow path, the selected flow path in FIG. 8b is a filtering circulation flow path, and the selected path in FIG. 8c is a ventilation flow path.

The control part 2 may control the operation of the outer intake portion 47 and outer discharge portion 48. The control part 2 may control the outer intake portion 47 and outer discharge portion 48 so as to select one of the plurality of flow paths (see FIGS. 8a to 8c).

Hereinafter, referring to FIGS. 8a to 8c, the air flow path P having a plurality of preset flow paths will be described in details below. FIGS. 8a to 8c show the arrows pointing the direction Af of air flow, and the type of the arrows vary for different sections of the air flow path P.

Air may be supplied into the treatment space 10s through the air flow path P. The air in the treatment space 10s may be circulated and supplied through the air flow path P. The air in the treatment space 10s may be drawn in from inside the treatment space 10s and discharged into the treatment space 10s, through the air flow path P. The air in the outer space Ou may be supplied into the treatment space 10s through the air flow path P.

The air moving through the air flow path P may be supplied into the treatment space 10s after going through a predetermined treatment space. For example, air heated by the heat exchange module 60 may be supplied into the treatment space 10s. Air dehumidified by the heat exchange module 60 may be supplied into the treatment space 10s. Air cooled by the heat exchange module 60 may be supplied into the treatment space 10s. Also, untreated air may be supplied into the treatment space 10s. Air with a deodorizer or anti-static agent added to it may be supplied into the treatment space 10s through the air flow path P.

One of the plurality of flow paths is preset to be selected. In this exemplary embodiment, although FIGS. 8a, 8b, and 8c illustrate that one of the plurality of flow paths Pa, Pb, and Pc is selected, the number of selected flow paths is not limited but two flow paths or four or more flow paths may be selected. By means of the at least one valve 70, the selected flow path may be switched from one of the plurality of flow paths to another.

The plurality of flow paths may be distinguished depending on whether air passes through the filter portion 95 or not. Referring to FIG. 8a, the plurality of flow paths may comprise at least one bypass flow path Pa for directing the air to bypass the filter portion 95. Referring to FIG. 8b and FIG. 8c, the plurality of flow paths may comprise at least one filtering flow path Pb and Pc for directing the air to pass through the filter portion 95. Here, whether or not the air passes through the filter portion 95 is defined with respect to a certain filter portion 95, but not with respect to another filter portion (e.g., an auxiliary filter portion 23b) through which the air passes. That is, the air bypassing the filter portion 95 does not mean to exclude that the air may pass through the auxiliary filter portion 23b.

The at least one bypass flow path Pa may comprise a bypass circulation flow path Pa for directing air drawn in from inside the treatment space 10s. The at least one filtering flow path Pb and Pc may comprise a filtering circulation flow path Pb for directing the air drawn in from inside the treatment space 10s. The at least one filtering flow path Pb and Pc may comprise a ventilation flow path Pc for directing the air drawn in from the outer space Ou.

The plurality of flow paths may be distinguished depending on whether air circulates in the treatment space 10s or not. Referring to FIG. 8a and FIG. 8b, the plurality of flow paths may comprise at least one circulation flow path Pa and Pb for directing the air drawn in from inside the treatment space 10s. Referring to FIG. 8c, the plurality of flow paths may comprise at least one ventilation flow path Pc for directing the air drawn in from the outer space Ou of the cabinet 10.

The at least one circulation flow path Pa and Pb may comprise a bypass circulation flow path Pa for directing air to bypass the filter portion 95. The at least one circulation flow path Pa and Pb may comprise a filtering circulation flow path Pb for directing air to pass through the filter portion 95. The ventilation flow path Pc may be provided to direct air to pass through the filter portion 95.

In this exemplary embodiment, the bypass circulation flow path Pa directs the air drawn in from inside the treatment space 10s so that it bypasses the filter portion 95. In this exemplary embodiment, the filtering circulation flow path Pb directs air drawn in from inside the treatment space 10s so that it passes through the filter portion 95. In this exemplary embodiment, the ventilation flow path Pc directs the air drawn in from the outer space Out to pass through the filter portion 95.

Referring to FIGS. 8a to 8c, each of the sections constituting part of the air flow path P will be described below. The air flow path P may comprise a shared section P0 which commonly constitutes part of the bypass flow path Pa and part of the filtering flow path Pb and Pc. The shared section P0 may commonly constitute part of the circulation flow path Pa and Pb and part of the ventilation flow path Pc. The shared section P0 may allow air to be directed out to the treatment space 10s. The air flow path P may comprise an inner inlet section P1 through which the air in the treatment space 10s is admitted. The air flow path P may comprise a filter pass-through section P2 in which the air is directed to pass through the filter portion 95. The air flow path P may comprise an outside air inlet section P4 through which the air is directed in from the outer space Ou.

Referring to FIG. 8a, the bypass circulation flow path Pa may be formed by sequentially connecting the inner inlet section P1 and the shared section P0. Referring to FIG. 8a and FIG. 11, while a first valve 70a is opened and a second valve 70b is closed, a first entrance 42 is opened and a second entrance 43 is closed. In this case, referring to FIG. 8a and FIG. 4, the outer intake portion 47 closes the outside air inlet section P4, and the outer discharge portion 48 closes the exhaust air outlet section P5. Air enters the inner inlet section P1 from the treatment space 10s through the inner intake opening 41. Air enters the shared section P0 from the inner inlet section P1 through the first entrance 42. The air that has passed through the shared section P0 is discharged to the treatment space 10s through the inner discharge opening 44. In this case, the air does not flow in and out between the outer space Ou and the treatment space 10s.

Referring to FIG. 8b, the filter circulation flow path Pb is formed by sequentially connecting the inner inlet section P1, filter pass-through section P2, and shared section P0. Referring to FIG. 8b and FIG. 11, while the first valve 70a is closed and the second valve 70b is opened, the first entrance 42 is closed and the second entrance 43 is opened. In this case, referring to FIG. 8a and FIG. 4, the outer intake portion 47 closes the outside air inlet section P4, and the outer discharge portion 48 closes the exhaust air outlet section P5. Air enters the inner inlet section P1 from the treatment space 10s through the inner intake opening 41. Air enters the filter pass-through section P2 from the inner inlet section P1 through the second entrance 43. The air that has passed through the filter portion 95 in the filter pass-through section P2 is admitted to the shared section P0. The air that has passed through the shared section P0 is discharged to the treatment space 10s through the inner discharge opening 44.

In this case, the air does not flow in and out between the outer space Ou and the treatment space 10s.

Referring to FIG. 8c, the ventilation flow path Pc may be formed by sequentially connecting the outside air inlet section P4, filter pass-through section P2, and shared section P0. Referring to FIG. 8c and FIG. 11, while both the first valve 70a and the second valve 70b are closed, both the first entrance 42 and the second entrance 43 are closed. In this case, referring to FIG. 8c and FIG. 4, the outer intake portion 47 opens the outside air inlet section P4, and the outer discharge portion 48 opens the exhaust air outlet section P5. Air enters the outside air inlet section P4 from the outer space Ou. Air enters the filter pass-through section P2 from the outside air inlet section P4 through the outside air connecting port 45. The air that has passed through the filter portion 95 in the filter pass-through section P2 is admitted to the shared section P0. The air that has passed through the shared section P0 is discharged to the treatment space 10s through the inner discharge opening 44. Also, the air in the treatment space 10s is released to the outer space Ou through the exhaust air outlet section P5.

Hereinafter, referring to FIGS. 6a to 8c and FIG. 11, the at least one valve 70 and the valve actuating module 80 will be described in details below.

As the at least one valve 70 is actuated, it allows for switching the selected flow path from one of the plurality of flow paths Pa, Pb, and Pc to another flow path. The actuation of the valve 70 may refer to the opening and closing of the valve 70. As the valve 70 opens and closes, it may switch from either the circulation flow path Pa or the filtering flow path Pb and Pc to the other. As the valve 70 opens and closes, it may switch from either the circulation flow path Pa and Pb or the ventilation flow path Pc to the other. As the valve 70 opens and closes, it may switch from one among the bypass circulatory path Pa, filtering flow path Pb and Pc, and ventilation flow path Pc to another.

The first entrance 42 may be disposed downstream of the inner intake opening 41. The first entrance 42 may be disposed at a downstream end of the inner inlet section P1. The first entrance 42 may be disposed at an upstream end of the shred section P0. The first entrance 42 may be placed perpendicular to the direction in which the filter module 90 is pulled out. The first entrance 42 may be placed perpendicular to the filter portion 95. The first entrance 42 may be disposed downstream from the auxiliary filter portion 23b. The first entrance 42 may be placed parallel to the auxiliary filter portion 23b.

The second entrance 43 may be disposed downstream of the inner intake opening 41. The second entrance 43 may be disposed at a downstream end of the inner inlet section P1. The second entrance 43 may be disposed at an upstream end of the filter pass-through section P2. The second entrance 43 may be placed perpendicular to the direction in which the filter module 90 is pulled out. The second entrance 43 may be placed perpendicular to the filter portion 95. The second entrance 43 may be disposed downstream from the auxiliary filter portion 23b. The second entrance 43 may be placed parallel to the auxiliary filter portion 23b.

The first entrance 42 and the second entrance 43 may be placed in the same plane. The first entrance 42 and the second entrance 43 may be separated from each other. The first entrance 42 and the second entrance 43 may be placed with the filter module 90 in between. A filter module insertion opening 26h into which the filter module 90 is inserted to be pulled out is formed between the first entrance 42 and the second entrance 43.

The at least one valve 70 may comprise a first valve 70a disposed on the bypass flow path Pa to open and close the flow path. The first valve 70a may open and close the first entrance 42. The first valve 70a opens the first entrance 42 when the bypass flow path Pa is selected. The first valve 70a closes the first entrance 42 when the filtering flow path Pb and Pc is selected. The first valve 70a closes the first entrance 42 when the filtering circulation flow path Pb is selected. The first valve 70a closes the first entrance 42 when the ventilation flow path Pc is selected.

The at least one valve 70 may comprise a second valve 70b disposed on the filtering flow path Pb and Pc to open and close the flow path. The second valve 70b may open and close the second entrance 43. The second valve 70b opens the second entrance 43 when the filtering circulation path Pb is selected. The second valve 70b closes the second entrance 43 when the bypass flow path Pa is selected. The second valve 70b closes the second entrance 43 when the ventilation flow path Pc is selected.

The first valve 70a may rotate around a first rotational axis Oa. The second valve 70b may rotate around a second rotational axis Ob. The first rotational axis Oa and second rotational axis Ob are virtual axes used to describe the present disclosure, and do not designate actual components of the apparatus. The first rotational axis Oa and second rotational axis Ob may be placed parallel to each other. The first rotational axis Oa may extend along one side of the first entrance 42. The second rotational axis Ob may extend along one side of the second entrance 43. The first rotational axis Oa and second rotational axis Ob may be placed horizontally. The first rotational axis Oa and second rotational axis Ob may be placed parallel to the filter module 90. While the first valve 70a and the second valve 70b are closed, the first rotational axis Oa may be placed on an end of the first valve 70a facing the second valve 70b, and the second rotational axis Ob may be placed on an end of the second valve 70b facing the first valve 70a. The filter module 90 may be placed between the first rotational axis Oa and the second rotational axis Ob.

The first valve 70a may comprise a shaft portion (not shown) that provides a function of the first rotational axis Oa and an open-close portion (not shown) that opens and closes the first entrance 42 while rotating. The shaft portion and open-close portion of the first valve 70a may be formed as a single unit.

The second valve 70b may comprise a shaft portion (not shown) that provides a function of the second rotational axis Ob and an open-close portion (not shown) that opens and closes the second entrance 43 while rotating. The shaft portion and open-close portion of the second valve 70b may be formed as a single unit.

The flow path body 26 may comprise a valve support portion 26b that rotatably supports the valve 70. The valve support portion 26b may be placed on two opposite ends of the shaft portion of the first valve 70a. The valve support portion 26b may be placed on two opposite ends of the shaft portion of the second valve 70b.

The flow path body 26 may comprise a valve limit 26c that restricts the range of rotation of the valve 70. The valve limit 26c may set the closed position of the valve 70. A first valve limit 26c1 is configured in such a way that the first valve 70a comes into contact with it while the first valve 70a is closed. A second valve limit 26c2 is configured in such a way that the second valve 70b comes into contact with it while the second valve 70b is closed (see FIG. 6a, FIG. 6b, and FIG. 11).

The first valve 70a may be opened as it rotates upward while closed. The first valve limit 26c1 may form a surface facing in the opposite direction of the direction Af of air flow. The first valve limit 26c1 may form an upward-facing surface.

The second valve 70b may be opened as it rotates upward while closed. The second valve limit 26c2 may form a surface facing in the opposite direction of the direction Af of air flow. The second valve limit 26c2 may form an upward-facing surface.

One end of the shaft portion of the first valve 70a may be fixed to a first valve connecting portion 81 to be described later, and the other end may be rotatably supported by a valve holder 27. One end of the shaft portion of the second valve 70b may be fixed to a second valve connecting portion 82 to be described later, and the other end may be rotatably supported by the valve holder 27. The valve holder 27 may be fixed to the flow path body 26. The valve holder 27 may be placed on the outer side of the flow path body 26. The valve holder 27 may extend while connecting the first rotational axis Oa and the second rotational axis Ob. The first valve 70a and the second valve 70b are located between the valve actuating module 80 and the valve holder 27.

The valve actuating module 80 may be fixed to the flow path body 26. The valve actuating module 80 may be fixed to the outer side of the flow path body 26. The valve actuating module 80 may be placed on one side of the first entrance 42 second entrance 43.

The valve actuating module 80 may actuate the first valve 70a and the second valve 70b to get them closed simultaneously. The valve actuating module 80 may actuate the first valve 70a and the second valve 70b in such a way that one of them is opened and the other is closed.

The valve actuating module 80 is configured in such a way that one of a plurality of modes to be described later is selected by opening and closing the first valve 70a and the second valve 70b. The valve actuating module 80 is configured in such a way as to select one of a plurality of modes including a first mode in which the first valve 70a is opened and the second valve 70b is closed, a second mode in which the first valve 70a is closed and the second valve 70b is opened, and a third mode in which both the first valve 70a and the second valve 70b are closed.

The valve actuating module 80 comprises a single motor 83 that provides torque to open and close the first valve 70a and the second valve 70b. The motor 83 comprises a motor shaft 83a protruding to one side. The motor 83 allows for manipulation of the opening and closing of the first valve 70a and second valve 70b by forward and backward rotations.

The valve actuating module 80 may comprise a module casing 87 that accommodates the motor 83 in it. The module casing 87 may be supported by the flow path body 26. The module casing 87 may rotatably support the first valve connecting portion 81 and the second valve connecting portion 82, which will be described later. The module casing 87 may rotatably support a valve regulating portion 84 to be described later. A constraining portion 88 to be described later is fixed to the module casing 87.

The valve actuating module 80 comprises a first valve connecting portion 81 connected to the first valve 70a so that the first valve 70a rotates together with its rotation. The first valve connecting portion 81 may rotate around a predetermined, first rotational axis Oa. In this exemplary embodiment, the first valve 70a is fixed to the first valve connecting portion 81 so that the first valve 70a and the first valve connecting portion 81 rotate as single unit on the first rotational axis Oa. Although not shown, another example may be given in which the first valve connecting portion 81 rotates around the first rotational axis Oa and the first valve 70a rotates around a different rotational axis from the first rotational axis Oa, but the first valve 70a may rotate together with the first valve connecting portion 81 by means of a gear or belt connected to it.

The first valve connecting portion 81 may comprise a first valve fixing portion 81a where the first valve 70a is fixed. One end of the shaft portion of the first valve 70a may be fixed to the first valve fixing portion 81a. The first valve fixing portion 81a may protrude along the first rotational axis Oa. The first valve fixing portion 81a may protrude outward from the module casing 87. The first valve fixing portion 81a may have a spline shaft so as to prevent slippage when rotating relative to the first valve 70a.

The first valve connecting portion 81 may comprise a first gear portion 81b. The first gear portion 81b may receive torque from the valve regulating portion 84. The first gear portion 81b may have a plurality of gear teeth along the circumference around the first rotational axis Oa. The first gear portion 81b may be placed inside the module casing 87. The first gear portion 81b and the first valve fixing portion 81a rotate as a single unit.

The valve actuating module 80 comprises a second valve connecting portion 82 connected to the second valve 70b so as to rotate together with the second valve 70b. The second valve connecting portion 82 may rotate around a predetermined, second rotational axis Ob. In this exemplary embodiment, the second valve 70b is fixed to the second valve connecting portion 82 so that the second valve 70b and the second valve connecting portion 82 rotate as single unit on the second rotational axis Ob. Although not shown, another example may be given in which the second valve connecting portion 82 rotates around the second rotational axis Ob and the second valve 70b rotates around a different rotational axis from the second rotational axis Ob, but the second valve 70b may rotate together with the second valve connecting portion 82 by means of a gear or belt connected to it.

The second valve connecting portion 82 may comprise a second valve fixing portion 82a where the second valve 70b is fixed. One end of the shaft portion of the second valve 70b may be fixed to the second valve fixing portion 82a. The second valve fixing portion 82a may protrude along the second rotational axis Ob. The second valve fixing portion 82a may protrude outward from the module casing 87. The second valve fixing portion 82a may have a spline shaft so as to prevent slippage when rotating relative to the second valve 70b.

The second valve connecting portion 82 may comprise a second gear portion 82b. The second gear portion 82b may receive torque from the valve regulating portion 84. The second gear portion 82b may have a plurality of gear teeth along the circumference around the second rotational axis Ob. The second gear portion 82b may be placed inside the module casing 87. The second gear portion 82b and the second valve fixing portion 82a rotate as a single unit.

The valve actuating module 80 comprises a valve regulating portion 84 configured to rotate the first valve connecting portion 81 and the second valve connecting portion 82. The valve regulating portion 84 may be placed inside the module casing 87.

The valve regulating portion 84 is placed in the module casing 87 in such a way as to rotate around a predetermined central axis Oc. The valve regulating portion 84 rotates around the predetermined central axis Oc, powered by the motor 83.

The valve regulating portion 84 may be configured to rotate either the first valve connecting portion 81 or the second valve connecting portion 82 depending on the angle of rotation. The valve regulating portion 84 may rotate in such a way as to transmit torque to only either the first valve connecting portion 81 or the second valve connecting portion 82 depending on the angle of rotation. The valve regulating portion 84 may rotate in such a way as to transmit torque to neither the first valve connecting portion 81 nor the second valve connecting portion 82.

The central axis Oc is a virtual axis used to describe the present disclosure, and does not designate an actual component of the apparatus. The central axis Oc is preset as a rotational axis different from the first rotational axis Oa and second rotational axis Ob. The central axis Oc may be placed parallel to the first rotational axis Oa and second rotational axis Ob.

The valve regulating portion 84 may comprise a driving gear portion 84a configured to mesh with either the first gear portion 81b or the second gear portion depending on the angle of rotation. The driving gear portion 84a may be configured to mesh with only either the first gear portion 81b or the second gear portion 82b depending on the rotation of the valve regulating portion 84. The driving gear portion 84a may be configured to mesh with neither the first gear portion 81b nor the second gear portion 82b depending on the rotation of the valve regulating portion 84.

The driving gear portion 84a may be formed along the direction of rotation of the valve regulating portion 84 within the range of a predetermined angle Ag2 with respect to the central axis Oc. The driving gear portion 84a has a plurality of gear teeth along the direction of rotation within the range of the predetermined angle Ag2. The angle Ag2 may be preset as an acute angle.

The predetermined angle Ag1 formed between the first rotational axis Oa and the second rotational axis Ob with respect to the central axis Oc may be greater than the angle Ag2. As such, either the first valve connecting portion 81 or the second valve connecting portion 82 may be rotated depending on the angle of rotation of the valve regulating portion 84. Referring to FIG. 8a, when the driving gear portion 84a is positioned on a virtual line connecting the central axis Oc and the first rotational axis Oa, by the rotation of the valve regulating portion 84, the driving gear portion 84a comes into contact with only the first gear portion 81b. Referring to FIG. 8b, when the driving gear portion 84a is positioned on a virtual line connecting the central axis Oc and the second rotational axis Ob, by the rotation of the valve regulating portion 84, the driving gear portion 84a comes into contact with only the second gear portion 82b. Referring to FIG. 8c, when the driving gear portion 84a is positioned within the range of the angle Ag1 by the rotation of the valve regulating portion 84, the driving gear portion 84a comes into contact with neither the first gear portion 81b nor the second gear portion 82b.

The first gear portion 81b and the second gear portion 82b may be positioned at the same distance from the central axis Oc. That is, the gear tooth of the first gear portion 81b closest to the central axis Oc and the gear tooth of the second gear portion 82b closest to the central axis Oc are positioned at the same distance from the central axis Oc. Also, the gear teeth of the driving gear portion 84a are positioned at a certain distance from the central axis Oc. As such, both the first gear portion 81b and the second gear portion 82b may be manipulated by the single driving gear portion 84a.

The first gear portion 81b and the second gear portion 82b may have the same shape. The first rotational axis Oa and the second rotational axis Ob may be positioned at the same distance d from the central axis Oc. As such, both the first gear portion 81b and the second gear portion 82b may be manipulated by the single driving gear portion 84a.

In this exemplary embodiment, the valve regulating portion 84 may comprise a driven gear portion 84b that receives torque from the motor 83. Although not shown, another exemplary embodiment may be given in which the motor shaft 83a is directly connected to the valve regulating portion 84 to receive torque.

The driven gear portion 84b may have a plurality of gear teeth along the circumference around the central axis Oc. The driven gear portion 84b may make contact with a power transmitting portion 85 to be described later and receive toque. In this exemplary embodiment, the driven gear portion 84b may mesh with a worm gear 85 to be described later. The driven gear portion 84b rotates around the central axis Oc, integrally with the driving gear portion 84a.

The valve regulating portion 84 may comprise a rotating body portion 84c where the driving gear portion 84a and the driven gear portion 84b are placed. The rotating body portion 84c may be rotatably placed in the module casing 87. The rotating body portion 84c may have a central shaft portion (not shown) that protrudes along the central axis Oc, and the module casing 87 may have a groove or hole in which the central shaft portion of the rotating body portion 84c is rotatably inserted. The driving gear portion 84a may be placed to protrude from the rotating body portion 84c in the direction the central axis Oc extends. The driven gear portion 84b may be placed along the circumference around the central axis Oc of the rotating body portion 84c.

The valve actuating module 80 may comprise a power transmitting portion 85 that transmits the torque of the motor 83 to the valve regulating portion 84. The power transmitting portion 85 may comprise a gear, belt, and/or pulley.

The power transmitting portion 85 may comprise at least one gear. In this exemplary embodiment, the power transmitting portion 85 may comprise, but not limited to, one gear.

In this exemplary embodiment, the power transmitting portion 85 may comprise a worm gear 85 fixed to the motor shaft 83a to rotate. The motor shaft 83a may be placed on a virtual transmission axis Om. The worm gear 85 is configured to rotate around the transmission axis Om. The worm gear 85 rotates integrally with the motor shaft 83a. The worm gear 85 rotates around the transmission axis Om by meshing with the driven gear portion 84b, and the valve regulating portion 84 therefore rotates around the central axis Oc.

The valve actuating module 80 comprises a constraining portion 88 that restricts the range of rotation of the valve regulating portion 84. The constraining portion 88 may protrude inward from an inner surface of the module casing 87. The position of the constraining portion 88 is fixed, and first and second locking surfaces of the valve regulating portion 84 to be described later are brought into contact with or separated from it as they rotate around the central axis Oc.

The constraining portion 88 may comprise a first constraining portion 88a that limits the maximum value for rotation of the valve regulating portion 84 in a first direction. The constraining portion 88 may comprise a second constraining portion 88b that limits the maximum value for rotation of the valve regulating portion 84 in a second direction. Here, one of the first and second directions represents a clockwise direction, and the other represents a counterclockwise direction. As used herein, the first direction refers to the direction in which the driving gear portion 84a rotates towards the first valve connecting portion 81, and the second direction refers to the direction in which the driving gear portion 84a rotates towards the second valve connecting portion 82.

The rotating body portion 84c comprises a first locking surface (not shown) configured to make contact with the first constraining portion 88a. The rotating body portion 84c comprises a second locking surface (not shown) configured to make contact with the second constraining portion 88b. The angle formed between the first locking surface and the second locking surface may be the predetermined angle Ag2. The driving gear portion 84a may be placed within the range of the angle between the first locking surface and the second locking surface.

Referring to FIG. 8a, the valve regulating portion 84 may be configured in such a way that, when it is fully rotated in the first direction, the first valve 70a is opened. At this point, the second valve 70b is closed. If the valve regulating portion 84 fully rotated in the first direction as in FIG. 8a rotates in the second direction, the first valve connecting portion 81 rotates by meshing with the driving gear portion 84a, whereby the first valve 70a rotates in a direction that allows the first entrance 42 to be closed. Here, if the valve regulating portion 84 continues to rotate in the second direction, the driving gear portion 84a is placed within the range of the predetermined angle Ag1 and the first valve 70a is closed, as can be seen in FIG. 8c. If the valve regulating portion 84 in FIG. 8c rotates in the second direction, the first valve 70a is kept closed and the second valve connecting portion 82 rotates by meshing with the driving gear portion 84a, whereby the second valve 70b rotates in a direction that allows the second entrance 43 to be opened. Here, if the valve regulating portion 84 continues to rotate in the second direction, the valve regulating portion 84 is fully rotated in the second direction, as can be seen in FIG. 8b.

Referring to FIG. 8b, the valve regulating portion 84 may be configured in such a way that, when it is fully rotated in the second direction, the second valve 70b is opened. At this point, the first valve 70a is closed. If the valve regulating portion 84 fully rotated in the second direction as in FIG. 8b rotates in the first direction, the second valve connecting portion 82 rotates by meshing with the driving gear portion 84a, whereby the second valve 70b rotates in a direction that allows the second entrance 43 to be closed. Here, if the valve regulating portion 84 continues to rotate in the first direction, the driving gear portion 84a is placed within the range of the predetermined angle Ag1 and the second valve 70b is closed, as can be seen in FIG. 8c. If the valve regulating portion 84 in FIG. 8c rotates in the first direction, the second valve 7b is kept closed and the first valve connecting portion 81 rotates by meshing with the driving gear portion 84a, whereby the first valve 70a rotates in a direction that allows the first entrance 42 to be opened. Here, if the valve regulating portion 84 continues to rotate in the first direction, the valve regulating portion 84 is fully rotated in the first direction, as can be seen in FIG. 8a.

While the valve regulating portion 84 is stuck on the constraining portion 88, the motor shaft 83a also is constrained and stops rotating. By constraining the rotation of the motor and rotating the motor in steps, the rotation of the first valve 70a and second valve 70b may be controlled. Here, the forward rotation of the motor shaft 83a refers to rotating the valve regulating portion 84 in the first direction, and the backward rotation of the motor shaft 83a refers to rotating the valve regulating portion 84 in the second direction.

To control the first valve 70a and the second valve 70b to close one of them and open the other (see FIGS. 8a and 8b), the motor shaft 83a may be rotated enough either forward or backward until it is constrained by the constraining portion 88. Referring to FIG. 8a, while the valve regulating portion 84 is fully rotated in the first direction by rotating the motor shaft 83a enough forward, the first valve 70a is opened and the second valve 70b is closed. Referring to FIG. 8b, while the valve regulating portion 84 is fully rotated in the second direction by rotating the motor shaft 83a enough backward, the second valve 70b is opened and the first valve 70a is closed.

Moreover, to control the first valve 70a and the second valve 70b to close both of them (see FIG. 8c), the motor shaft 83a may be rotated enough either forward or backward until it is constrained by the constraining portion 88, and then rotated (in steps) in the opposite direction by a certain angle of rotation. In an example, while the valve regulating portion 84 is fully rotated in the first direction (as in FIG. 8a) by rotating the motor shaft 83a enough forward, the first valve 70a is opened. Hereupon, if the valve regulating portion 84 is rotated in the second direction by rotating the motor shaft 83a backward by a predetermined angle of rotation, both the first valve 70a and the second valve 70b may be closed (as in FIG. 8c). In another example, while the valve regulating portion 84 is fully rotated in the second direction (as in FIG. 8b) by rotating the motor shaft 83a enough backward, the second valve 70b is opened. Hereupon, if the valve regulating portion 84 is rotated in the first direction by rotating the motor shaft 83a forward by a predetermined angle of rotation, both the first valve 70a and the second valve 70b may be closed (as in FIG. 8c).

The angle of rotation may be preset to an appropriate value depending on the gear ratio between the power transmitting portion 85 and the valve regulating portion 84. If the rotational speed of the motor is constant, the angle of rotation may be controlled by the rotation time preset for the motor.

By controlling the valve actuating module 80, the control part 2 may always reset the position of the valve 70 so that both the first valve 70a and the second valve 70b are in the closed state (see FIG. 8c) when the clothes treatment apparatus 1 is powered on.

Referring to FIGS. 9 to 12, the filter module 90 may be placed between the first valve 70a and the second valve 70b. The filter module 90 may be placed between the first entrance 42 and the second entrance 43.

The filter module 90 is configured in such a way as to be pushed into or pulled out of a filter module insertion opening 26h formed in the flow path body 26. While the filter module 90 is fully inserted into the filter module insertion opening 26h, the filter portion 95 is placed in the filter pass-through section P2 on the air flow path P.

The filter module 90 is configured in such a way as to be pushed in or pulled out in a predetermined direction M3 of insertion and removal motion. The filter module 90 is configured in such a way as to be pulled out in a direction across the filtering flow path Pb and Pc. In this exemplary embodiment, the filter module 90 is configured in such a way as to be pulled out upward. The filter module 90 is configured in such a way as to be pulled out from the bottom side of the treatment space 10s.

The filter module 90 comprises a filter portion 95 for filtering out impurities passing through it. The filter portion 95 is functionally different from an auxiliary filter portion 23b to be described later. The filter portion 95 may filter out even minute particles compared to the auxiliary filter portion 23b.

The filter portion 95 may comprise a high efficiency particulate air filter (HEPA). The HEPA filter should be replaced because it is a consumable item. The HEPA filter filters out very fine dust, bacteria, mold, etc. For example, the HEPA filter has a filtration efficiency of 99.97% for particles that are about 0.3 For example, the HEPA filter may be formed of a material of glass fiber or asbestos fiber.

The HEPA filter cannot be washed with water and can be cleaned using a brush or the like. Thus, it is necessary that no more than a predetermined amount of steam passes through the HEPA. The filtering flow path Pb and Pc enables it to take advantage of the high-performance functions of the HEPA filter, and the bypass flow path Pa allows for guiding steam not to pass through the HEPA when supplied into the treatment space through the steam module 7.

The filter module 90 comprises a filter body portion 91 that supports the filter portion 95. The filter portion 95 may be removably placed at the filter body portion 91. To replace the filter portion 95, the filter body portion 91 may be pulled out from the flow path body 26, and then the filter portion 95 may be removed from the filter body portion 91.

The filter module 90 may comprise a handle 93 provided to let the user hold the filter module 90 with a hand, while the filter body portion 91 is fully inserted into the flow path body 26. The handle 93 is fixed to the filter body portion 91. The handle 93 may be disposed on the top of the filter body portion 91. When the cover 25 and the auxiliary filter 23 are removed, the handle 93 may be exposed.

The filter body portion 91 comprise a filter placement portion 91a where the filter portion 95 is placed. The filter placement portion 91a guides the position of the filter portion 95. The filter placement portion 91a makes contact with one side of the filter portion 95. The filter placement portion 91a may have a lattice structure. The filter placement portion 91a may comprise a first placement portion 91a1 extending horizontally and a second placement portion 91a2 extending vertically. Air passes through an opening formed by the filter placement portion 91a.

The filter body portion 91 comprises a frame portion 91b that sets a relative positional relationship between the handle 93 and the filter portion 95. The frame portion 91b may surround the perimeter of the filter portion 95. The frame portion 91b has a structure that keeps a predetermined distance between the filter portion 95 and the handle 93.

Referring to FIG. 3 and FIGS. 9 to 11, the cover 25 may form the inner intake opening 41 and cover a side where the filter module 90 is pulled out. The cover 25 may form the inner intake opening 41 through which air is admitted to the bypass flow path Pa and the filtering flow path Pb. The inner intake opening 41 may be formed by a gap between the cover 25 and the bottom side of the treatment space 10s.

The cover 25 may cover the side where the filter module 90 is pulled out. The cover may cover a side where the auxiliary filter 23 is removed.

The cover 25 may be removably placed on the cabinet 10. The cover 25 may be removably placed on the interior cabinet 10a. The cover 25 may be placed in such a way as to be removable from the bottom side of the treatment space 10s.

The flow path body 26 may comprise a cover support portion 26a that supports the cover 25. The cover support portion 26a may form part of the air flow path P. The cover support portion 26a may form at least part of the inner intake opening P1. The cover support portion 26a may be in the shape of a column that forms the air flow path P in it. The upper end of the cover support portion 26a may be connected to the bottom side of the treatment space 10s. The cover support portion 26a may have a stepped portion where a cover supporter 25a2 is placed.

The cover 25 may comprise a cover body 25a supported by the cover support portion 26a. The cover body 25a may comprise a cover portion 25a1 that forms a flat surface vertically separated from the bottom side of the treatment space 10s. The cover portion 25a1, when viewed from above, conceals the inner intake opening 41. The cover body 25a may comprise a cover supporter 25a2 supporting the cover portion 25a1. The upper end of the cover supporter 25a2 may be fixed to the lower side of the cover portion 25a1, and the lower end may come into contact with the cover support portion 26a. The cover supporter 25a2 may extend downward from the cover portion 25a1 to a specific point, and may be bent horizontally at the specific point. A pair of left and right cover supporters 25a2 may be symmetrically placed. A gap between the cover supporter 25a2 and the cover portion 25a1 may form at least part of the inner intake opening 41.

The cover 25 may comprise a fragrance sheet 25b. The fragrance sheet 25b may have a fragrance added to ambient air that makes the user feel fresh. By including the fragrance sheet 25b in the cover 25 forming the inner intake opening 41, fragrance may be added efficiently to the air passing through the bypass flow path Pa and the filtering flow path Pb.

Referring to FIG. 9 and FIG. 11, the auxiliary filter 23 may be placed between the filter module and the cover. The auxiliary filter 23 may be disposed upstream of the first entrance 42 and second entrance 43. The auxiliary filter 23 may be disposed upstream of the filter module 90. The auxiliary filter 23 may be disposed downstream of the cover 25.

The auxiliary filter 23 may be supported by the flow path body 26. The auxiliary filter 23 may be removably placed. The auxiliary filter 23 may be removably placed on the interior cabinet 10a. The auxiliary filter 23 may be placed in such a way as to be removable from the bottom side of the treatment space 10s.

The auxiliary filter 23 may comprise an auxiliary filter portion 23b which filters out impurities from the air moving to the bypass flow path Pa and filtering flow path Pb through the inner intake opening 41. The auxiliary filter portion 23b may be placed horizontally. The auxiliary filter portion 23b filters out dust from the air passing through it, but may be functionally different from the filter portion 95. The auxiliary filter portion 23b is not the HEPA filter. The auxiliary filter portion 23b may form a mesh filter, for example. The auxiliary filter portion 23b may only filter out relatively large impurities, compared to the filter portion 95. The auxiliary filter portion 23b is configured in such a way that steam can pass through it. Through this, a filtering function may be added to both the bypass flow path Pa and the filtering flow path Pb, by means of the single auxiliary filter 23.

The filter module 90 comprises an auxiliary body portion 23a supporting the auxiliary filter portion 23b. The auxiliary body portion 23a may be placed across the direction Af of air flow. The auxiliary body portion 23a has a plurality of openings, and the auxiliary filter portion 23b is placed at the plurality of openings.

Referring to FIG. 3 and FIG. 9, the user may pull out the filter module after opening the door 15 and removing the cover 25. The user may pull out the filter module 90 after removing the cover 25 and then the auxiliary filter 23 to be described later.

Referring to (a) of FIG. 9, one side of the auxiliary filter 23 is exposed, with the cover 25 being removed from the cabinet 10. Referring to (b) of FIG. 9, the handle 93 of the filter module 90 is exposed, with the auxiliary filter 23 being removed from the cabinet 10. The first valve 70a and the second valve 70b may be exposed, with the auxiliary filter 23 being removed. Referring to (c) of FIG. 9, the filter module 90 is pulled out from the filter module insertion opening 26h by grabbing and pulling the handle 93.

Hereinafter, referring to FIG. 5 and FIGS. 8a to 8c, a plurality of modes will be described below in details. The control part 2 is configured to select one of a plurality of preset modes. The control part 2 may control various components in the clothes treatment apparatus 1 according to the selected mode.

The plurality of modes may be distinguished depending on whether they allow air to be filtered by the filter portion 95. The plurality of modes may comprise at least one bypass mode and at least one filtering mode.

In the bypass mode, the control part 2 controls the steam module 7 to spray steam into the treatment space 10s. In the bypass mode, the control part 2 controls the fan 50 to bring it into operation. In the bypass mode, the control part 2 controls the valve actuating module 80 so as to select the bypass flow path Pa from among the plurality of flow paths. Therefore, a treatment can be done while circulating the air in the treatment space 10s, without allowing the steam supplied to the treatment space 10s to pass through the filter portion 95.

In the filtering mode (filtering circulation mode and ventilation mode), the control part 2 controls the steam module 7 not to spray steam into the treatment space 10s. In the ventilation mode, the control part 2 controls the fan 50 to bring it into operation. In the ventilation mode, the control part 2 may control in such a way that the filtering flow path Pb and Pc is selected from among the plurality of flow paths.

The plurality of modes may be distinguished depending on whether they allow for air circulation in the treatment space 10s. The plurality of modes may comprise at least one ventilation mode and at least one ventilation mode.

In the circulation mode (bypass circulation mode and filtering circulation mode), the control part 2 controls the fan 50 to bring it into operation. In the circulation mode, the control part 2 controls the valve actuating module 80 so as to select the circulation flow path Pa and Pb from among the plurality of flow paths.

When the circulation mode is selected, the bypass circulation flow path Pa or the filtering circulation flow path Pb is selected from among the plurality of flow paths. When the bypass circulation flow path Pa or the filtering circulation flow path Pb is selected, the control part 2 controls in such a way that the outer intake portion 47 and the outer discharge portion 48 are closed. That is, the outer intake portion 47 closes the outside air inlet section P4, and the outer discharge portion 48 closes the exhaust air outlet section P5.

In the ventilation mode, the control part 2 controls the fan 50 to bring it into operation. In the ventilation mode, the control part 2 controls the valve actuating module 80 so as to select the ventilation flow path Pc from among the plurality of flow paths.

When the ventilation mode is selected, the ventilation flow path Pc is selected from among the plurality of flow paths. When the ventilation flow path Pc is selected, the control part 2 controls in such a way that the outer intake portion 47 and the outer discharge portion 48 are opened. That is, the outer intake portion 47 opens the outside air inlet section P4, and the outer discharge portion 48 opens the exhaust air outlet section P5.

The plurality of modes may comprise a bypass circulation mode, a filtering circulation mode, and a ventilation mode. The plurality of modes may be selected through the user's input using the input part 3. The plurality of modes may be selected and performed at different time slots in a single clothes treatment process. The plurality of modes may be selected and performed differently based on information sensed by the sensing part 4.

In the bypass circulation mode, the control part 2 controls the steam module 7 to spray steam into the treatment space 10s. In the bypass circulation mode, the control part 2 controls the fan 50 to bring it into operation. In the bypass circulation mode, the control part 2 controls the valve actuating module 80 so as to select the bypass circulation flow path Pa from among the plurality of flow paths. In the bypass circulation mode, the control part 2 controls in such a way that the first valve 70a is opened and the second valve 70b is closed. In the bypass circulation mode, the control part 2 controls in such a way that the outer intake portion 47 and the outer discharge portion 48 are closed. The bypass circulation mode can facilitate efficient supply of steam to clothes.

In the filtering circulation mode, the control part 2 controls the steam module 7 not to spray steam into the treatment space 10s. In the filtering circulation mode, the control part 2 controls the fan 50 to bring it into operation. In the filtering circulation mode, the control part 2 controls the valve actuating module 80 so as to select the filtering circulation flow path Pb from among the plurality of flow paths. In the filtering circulation mode, the control part 2 controls in such a way that the first valve 70a is closed and the second valve 70b is opened. In the filtering circulation mode, the control part 2 controls in such a way that the outer intake portion 47 and the outer discharge portion 48 are closed. In the filtering circulation mode, the control part 2 may control the hanger module 30 so as to make it vibrate. The filtering circulation mode allows for efficient removal of impurities clinging to clothes.

In the bypass circulation mode and the filtering circulation mode, the control part 2 may vary the vibration pattern of the hanger module 30. In an example, the control part 2 may control the hanger module 30 to vibrate relatively slowly in the bypass circulation mode and relatively fast in the filtering circulation mode.

In the ventilation mode, the control part 2 may control the steam module 7 not to spray steam into the treatment space 10s. In the ventilation mode, the control part 2 controls the fan 50 to bring it into operation. In the ventilation mode, the control part 2 may control the valve actuating module 80 so as to select the ventilation flow path Pc from among the plurality of flow paths. In the ventilation mode, the control part 2 controls in such a way that the first valve 70a is closed and the second valve 70b is closed. In the ventilation mode, the control part 2 controls in such a way that the outer intake portion 47 and the outer discharge portion 48 are opened. In the ventilation mode, the control part 2 may control the hanger module 30 not to vibrate. The ventilation mode allows for efficient removal of humidity or odorous components in clothes. Moreover, in the ventilation mode, dust or odorous components in the treatment space 10s may be released to the outside, thereby improving the quality of the space in which clothes are stored.

The invention claimed is:

1. A clothes treatment apparatus comprising:
   a cabinet forming a treatment space for storing clothes;
   a flow path body disposed in the cabinet and below the treatment space, the flow path body includes an inner intake opening provided to draw in air from inside the treatment space and an inner discharge opening provided to discharge air into the treatment space;
   a fan disposed in the flow path body and configured to move air in the flow path body;
   a filter module detachably disposed in the flow path body through the inner intake opening, the filter module includes a filter portion for filtering out dust from air passing therethrough;
   a first entrance configured to guide the air flowing through the inner intake opening to bypass the filter portion;
   a second entrance configured to guide the air flowing through the inner intake opening to pass through the filter portion;
   a first valve configured to open and close the first entrance;
   a second valve configured to open and close the second entrance;
   a valve actuating module configured to actuate the first valve and the second valve; and
   a filter module insertion opening disposed between the first entrance and the second entrance;
   wherein the filter module is inserted in the filter module insertion opening.

2. The clothes treatment apparatus of claim 1, wherein the filter module separates the first entrance and the second entrance from each other.

3. The clothes treatment apparatus of claim 1, wherein the first entrance, the second entrance and the filter module insertion opening are arranged in parallel.

4. The clothes treatment apparatus of claim 1, wherein the first entrance is disposed behind the second entrance.

5. The clothes treatment apparatus of claim 1, wherein the first entrance is disposed closer to the inner discharge opening than the filter module insertion opening, and wherein the second entrance is disposed farther from the inner discharge opening than the filter module insertion opening.

6. The clothes treatment apparatus of claim 1, wherein the filter module includes:
   a filter body portion configured to support the filter portion; and
   a handle disposed on a top of the filter body portion and configured to be held, and
   wherein the filter portion is located below the filter module insertion opening.

7. The clothes treatment apparatus of claim 1, further comprising an auxiliary filter configured to filter out foreign substances in the air moving from the treatment space to the first entrance or the second entrance.

8. The clothes treatment apparatus of claim 7, wherein the auxiliary filter is detachably disposed at the flow path body.

9. The clothes treatment apparatus of claim 7, wherein the auxiliary filter is disposed upstream of the filter module.

10. The clothes treatment apparatus of claim 7, wherein the auxiliary filter includes:
    an auxiliary filter portion configured to filter out foreign substances in the air moving from the treatment space to the first entrance or the second entrance; and
    an auxiliary body portion configured to support the auxiliary filter portion.

11. The clothes treatment apparatus of claim 10, wherein the auxiliary body portion is supported by the flow path body.

12. The clothes treatment apparatus of claim 10, wherein the auxiliary filter portion is configured to filter out relatively large foreign substances compared to the filter portion.

13. The clothes treatment apparatus of claim 10, wherein the auxiliary filter portion is disposed perpendicular to the filter portion.

14. The clothes treatment apparatus of claim 1, further comprising a steam module configured to supply steam into the treatment space, and
    wherein the filter portion comprises a HEPA filter.

* * * * *